US012739208B2

(12) United States Patent
Hibi et al.

(10) Patent No.: US 12,739,208 B2
(45) Date of Patent: Sep. 15, 2026

(54) DATA TRANSFER SYSTEM, DATA TRANSFER DEVICE, AND DATA TRANSFER METHOD

(71) Applicant: NTT, Inc., Tokyo (JP)

(72) Inventors: Tomoya Hibi, Musashino (JP); Kiwami Inoue, Musashino (JP); Junki Ichikawa, Musashino (JP); Yukio Tsukishima, Musashino (JP); Kenji Shimizu, Musashino (JP)

(73) Assignee: NTT, Inc., Tokyo (JP)

( * ) Notice: Subject to any disclaimer, the term of this patent is extended or adjusted under 35 U.S.C. 154(b) by 27 days.

(21) Appl. No.: 18/728,270

(22) PCT Filed: Jan. 20, 2022

(86) PCT No.: PCT/JP2022/002040

§ 371 (c)(1),
(2) Date: Jul. 11, 2024

(87) PCT Pub. No.: WO2023/139731

PCT Pub. Date: Jul. 27, 2023

(65) Prior Publication Data

US 2025/0097160 A1 Mar. 20, 2025

(51) Int. Cl.
*H04L 5/00* (2006.01)
*G06F 13/42* (2006.01)
(Continued)

(52) U.S. Cl.
CPC .......... *H04L 47/2458* (2013.01); *H04L 67/06* (2013.01)

(58) Field of Classification Search
CPC ........... G06F 12/0868; G06F 15/17331; G06F 3/0604; H04L 65/752
See application file for complete search history.

(56) References Cited

U.S. PATENT DOCUMENTS 11,625,353 B1 * 4/2023 Bonne ................. G06F 13/4208 710/104
2011/0019557 A1 1/2011 Hassan et al.
(Continued)

FOREIGN PATENT DOCUMENTS

WO WO 2013183649 12/2013

OTHER PUBLICATIONS

Balman et al., "Experiences with 100Gbps Network Applications," In Proceedings of the Fifth International Workshop on Data-Intensive Distributed Computing Date, Jun. 2012, 33-42.
(Continued)

*Primary Examiner* — Nicholas R Taylor
*Assistant Examiner* — Ho T Shiu
(74) *Attorney, Agent, or Firm* — Fish & Richardson P.C.

(57) ABSTRACT

A data transfer system includes: a transmission side data transfer device that transmits a plurality of pieces of data generated by a data generator; and a reception-side data transfer device that transmits a bundle of the pieces of data to a remote computer, the transmission-side data transfer device includes: a distribution unit that distributes the plurality of pieces of data to distribution destinations having priorities of the respective pieces of data; a generation unit that consolidates a plurality of pieces of data respectively distributed to the distribution destinations into each chunk having a size greater than or equal to a certain size, in order from one of the distribution destinations having a high priority; and a transmission unit that transmits each of the chunks to the reception-side data transfer device, and the reception-side data transfer device includes a determination unit that determines the priorities of the pieces of data.

7 Claims, 18 Drawing Sheets

(51) Int. Cl.
*H04L 47/24* (2022.01)
*H04L 67/06* (2022.01)

(56) References Cited

U.S. PATENT DOCUMENTS

| | | | | |
|---|---|---|---|---|
| 2015/0117464 | A1 | 4/2015 | Miyamoto | |
| 2018/0007108 | A1 | 1/2018 | Karkkainen et al. | |
| 2019/0281367 | A1* | 9/2019 | Westerlund | H04L 65/70 |
| 2021/0374089 | A1* | 12/2021 | Ohtsuji | G06F 15/17331 |

OTHER PUBLICATIONS

Ghemawat et al., "The Google file system," In Proceedings of the Nineteenth ACM Symposium on Operating Systems Principles, Bolton Landing, NY, USA, Oct. 19-22, 2003, 37(5):29-43.

Saeed et al., "Eiffel: Efficient and flexible software packet scheduling," In 16th {USENIX} Symposium on Networked Systems Design and Implementation (NSDI '19), Boston, MA, USA, Feb. 28-28, 2019, 17-32.

Sivaraman et al., "Programmable packet scheduling at line rate," In Proceedings of the 2016 ACM Sigcomm Conference, Florianopolis, Brazil, Aug. 22-26, 2016, 44-57.

Tatebe et al., "Grid Datafarm Architecture for Global Petascale Data-intensive Computing," Journal of Information Processing Society of Japan: High Performance Computing System, Information Processing Society of Japan, Sep. 2002, 43(SIG 6 (HPS5): 184-195.

Weil et al., "Ceph: A scalable, high-performance distributed file system," In Proceedings of the 7th symposium on Operating Systems Design and Implementation (OSDI '06), Seattle, WA, USA, Nov. 6-8, 2006, 307-320, 14 pages.

Yamanaka et al., "High-performance data transfer for full data replication between iter and the remote experimentation centre," Fusion Engineering and Design, Jan. 2019, 138(2019):202-209.

* cited by examiner

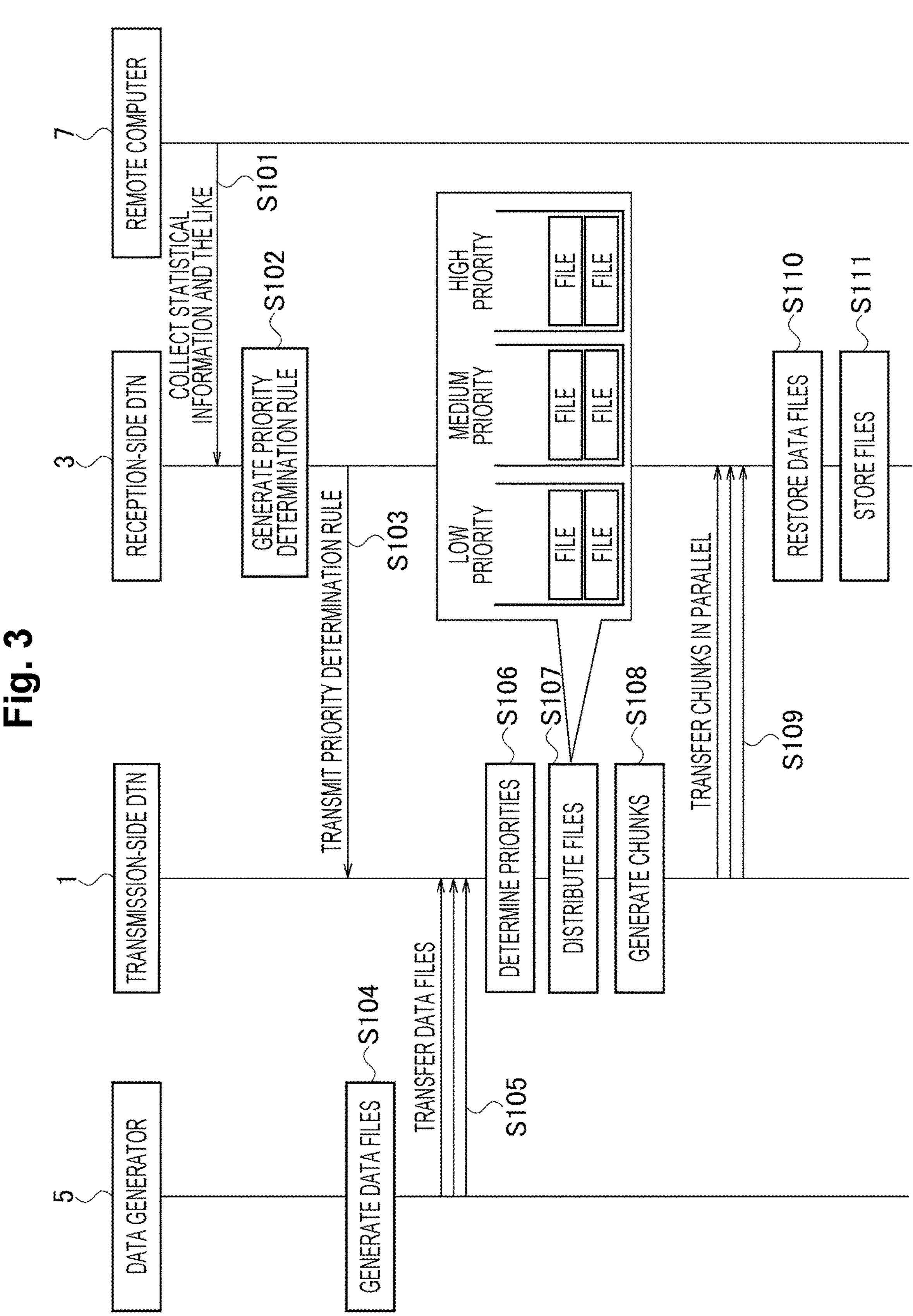
Fig. 3
7
REMOTE COMPUTER
3
RECEPTION-SIDE DTN
1
TRANSMISSION-SIDE DTN
5
DATA GENERATOR
COLLECT STATISTICAL INFORMATION AND THE LIKE
S101
S102
GENERATE PRIORITY DETERMINATION RULE
TRANSMIT PRIORITY DETERMINATION RULE
S103
S104
GENERATE DATA FILES
TRANSFER DATA FILES
S105
S106
DETERMINE PRIORITIES
S107
DISTRIBUTE FILES
S108
GENERATE CHUNKS
LOW PRIORITY
MEDIUM PRIORITY
HIGH PRIORITY
FILE
FILE
FILE
FILE
FILE
FILE
TRANSFER CHUNKS IN PARALLEL
S109
S110
RESTORE DATA FILES
S111
STORE FILES

Fig. 5

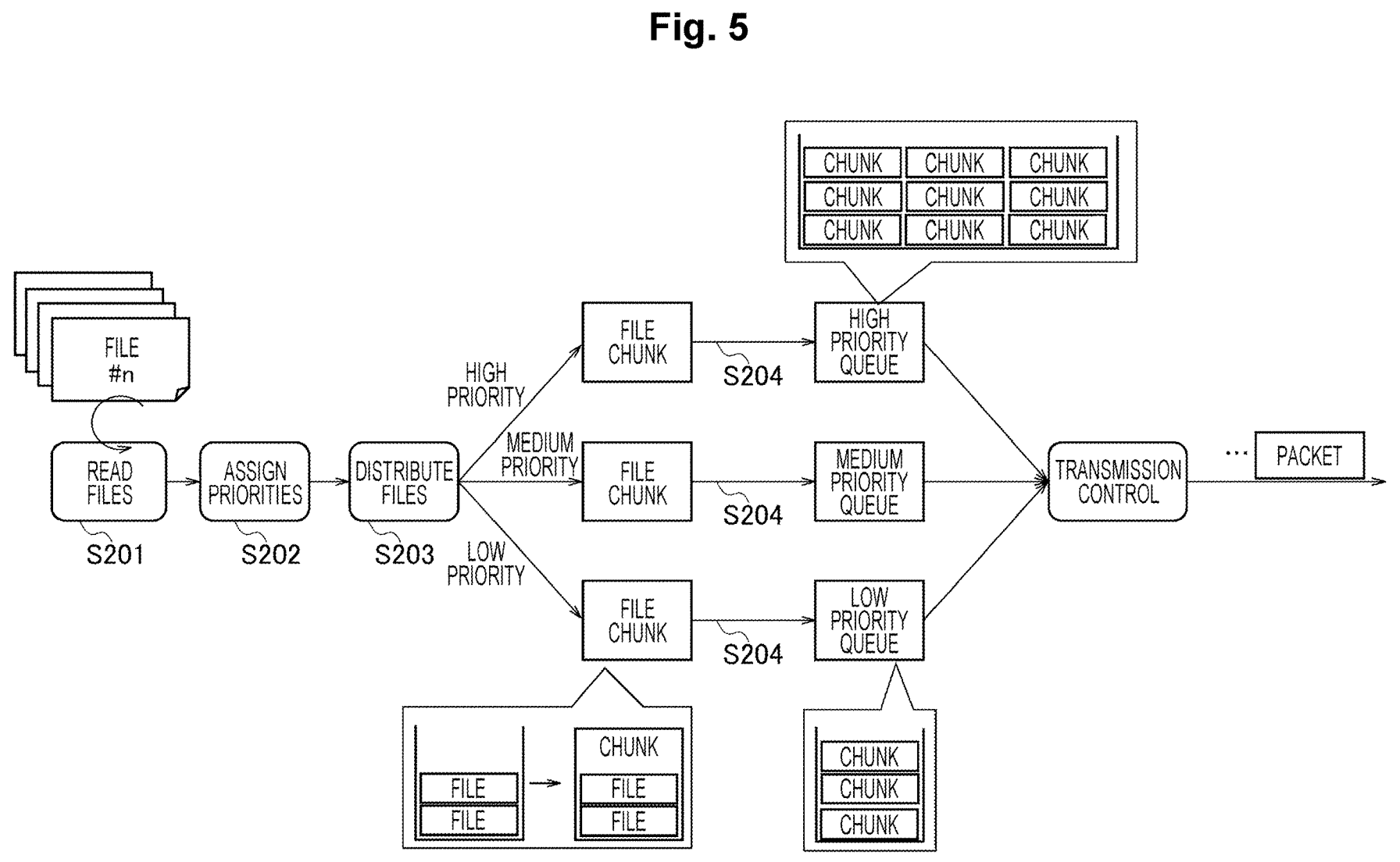

FILE #n

READ FILES S201

ASSIGN PRIORITIES S202

DISTRIBUTE FILES S203

HIGH PRIORITY

MEDIUM PRIORITY

LOW PRIORITY

FILE CHUNK

FILE CHUNK

FILE CHUNK

FILE FILE → CHUNK FILE FILE

S204

S204

S204

HIGH PRIORITY QUEUE

MEDIUM PRIORITY QUEUE

LOW PRIORITY QUEUE

CHUNK CHUNK CHUNK CHUNK CHUNK CHUNK CHUNK CHUNK CHUNK

CHUNK CHUNK CHUNK

TRANSMISSION CONTROL

… PACKET

Fig. 10

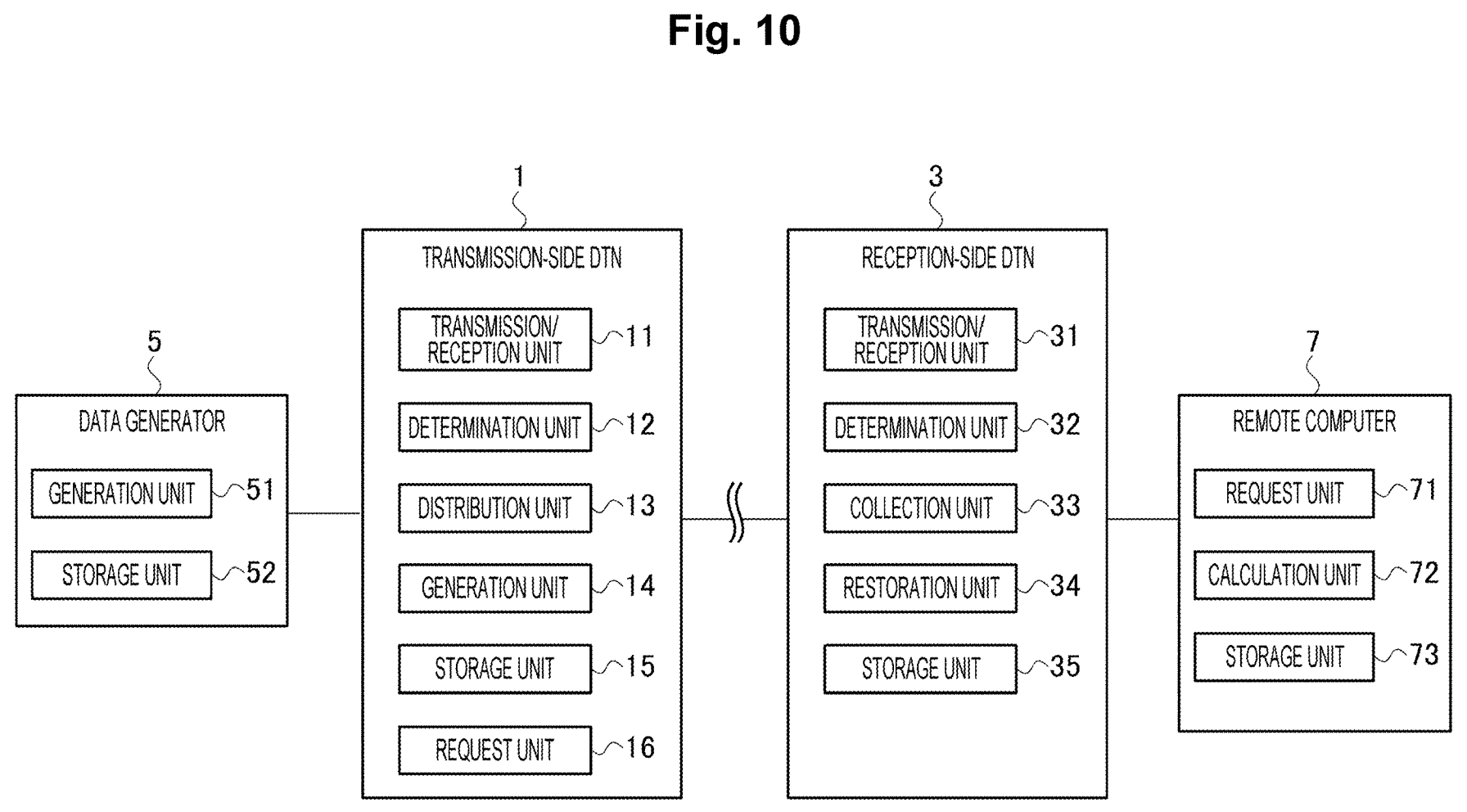

5 DATA GENERATOR
51 GENERATION UNIT
52 STORAGE UNIT

1 TRANSMISSION-SIDE DTN
11 TRANSMISSION/RECEPTION UNIT
12 DETERMINATION UNIT
13 DISTRIBUTION UNIT
14 GENERATION UNIT
15 STORAGE UNIT
16 REQUEST UNIT

3 RECEPTION-SIDE DTN
31 TRANSMISSION/RECEPTION UNIT
32 DETERMINATION UNIT
33 COLLECTION UNIT
34 RESTORATION UNIT
35 STORAGE UNIT

7 REMOTE COMPUTER
71 REQUEST UNIT
72 CALCULATION UNIT
73 STORAGE UNIT

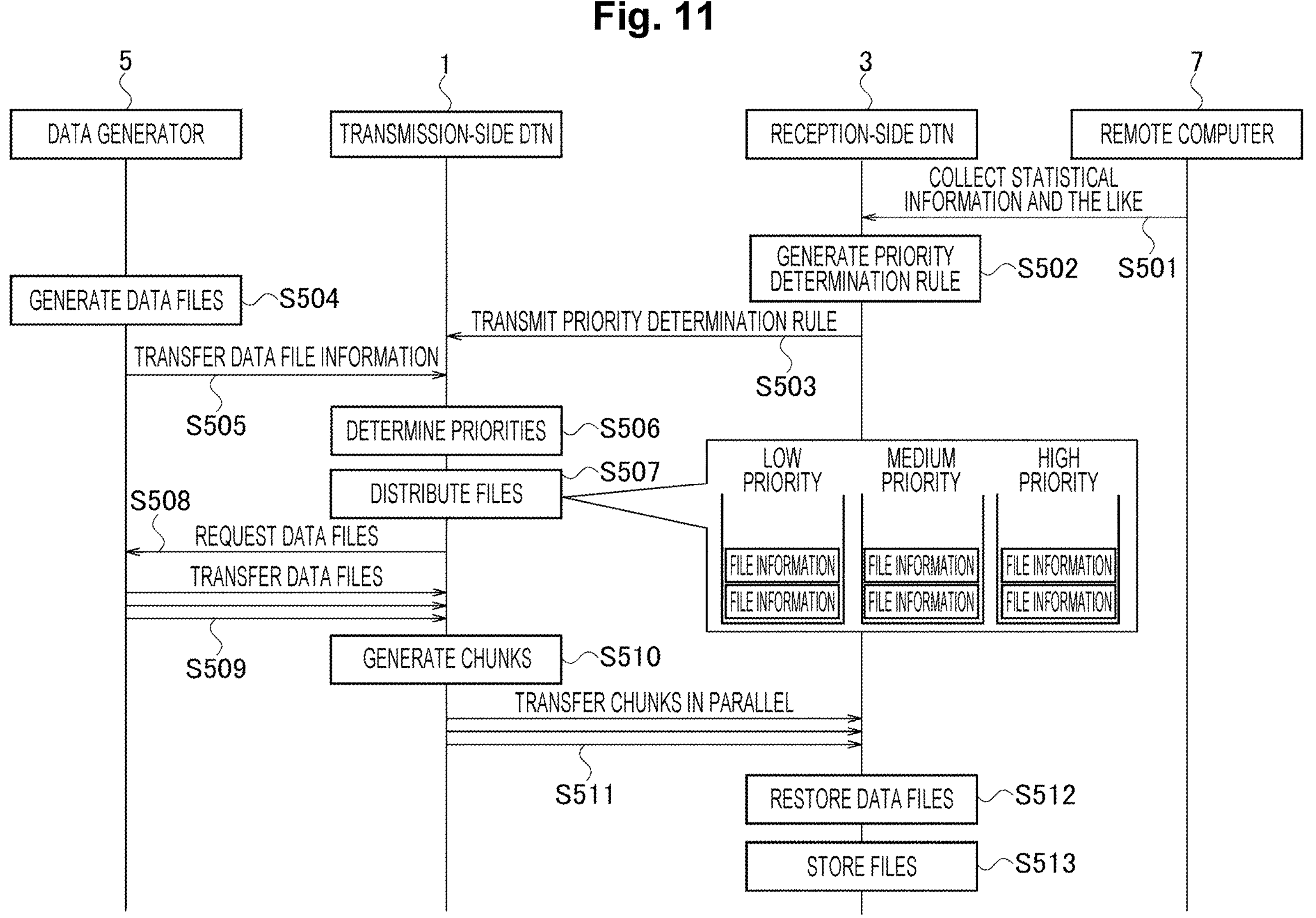
Fig. 11
5
DATA GENERATOR
1
TRANSMISSION-SIDE DTN
3
RECEPTION-SIDE DTN
7
REMOTE COMPUTER
COLLECT STATISTICAL INFORMATION AND THE LIKE
S501
GENERATE PRIORITY DETERMINATION RULE
S502
GENERATE DATA FILES
S504
TRANSMIT PRIORITY DETERMINATION RULE
S503
TRANSFER DATA FILE INFORMATION
S505
DETERMINE PRIORITIES
S506
DISTRIBUTE FILES
S507
LOW PRIORITY
MEDIUM PRIORITY
HIGH PRIORITY
FILE INFORMATION
S508
REQUEST DATA FILES
TRANSFER DATA FILES
S509
GENERATE CHUNKS
S510
TRANSFER CHUNKS IN PARALLEL
S511
RESTORE DATA FILES
S512
STORE FILES
S513

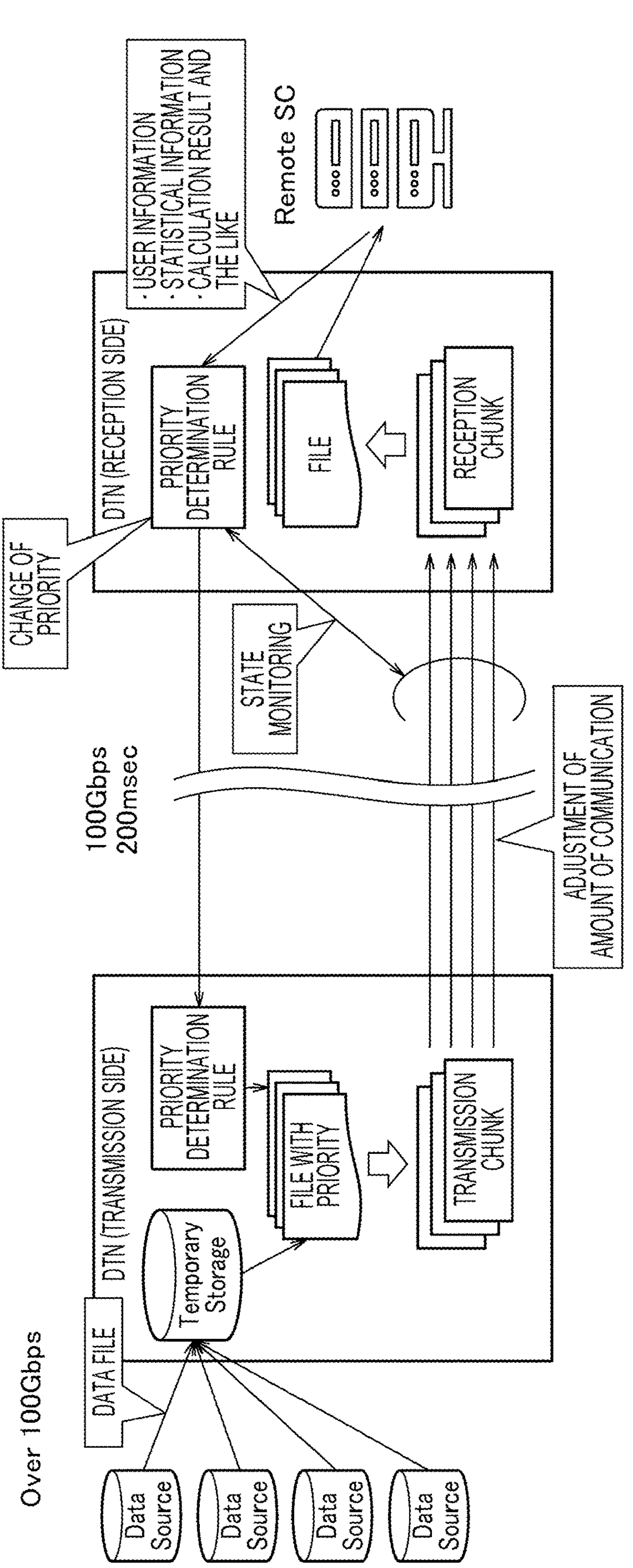
Fig. 12
Over 100Gbps
Data Source
Data Source
Data Source
Data Source
DATA FILE
DTN (TRANSMISSION SIDE)
Temporary Storage
PRIORITY DETERMINATION RULE
FILE WITH PRIORITY
TRANSMISSION CHUNK
100Gbps
200msec
ADJUSTMENT OF AMOUNT OF COMMUNICATION
STATE MONITORING
CHANGE OF PRIORITY
DTN (RECEPTION SIDE)
PRIORITY DETERMINATION RULE
FILE
RECEPTION CHUNK
· USER INFORMATION
· STATISTICAL INFORMATION
· CALCULATION RESULT AND THE LIKE
Remote SC

Fig. 16

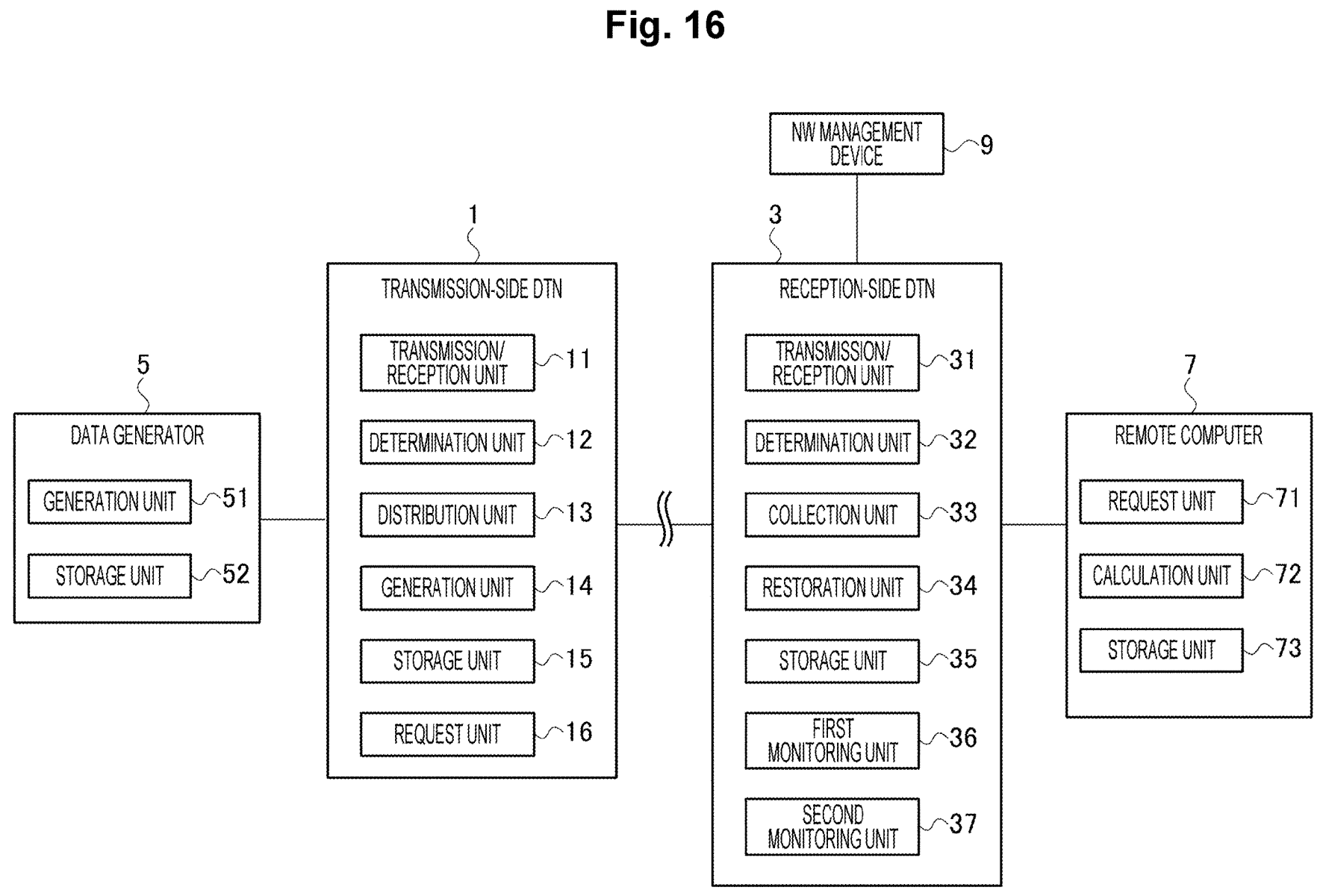

5 DATA GENERATOR
51 GENERATION UNIT
52 STORAGE UNIT

1 TRANSMISSION-SIDE DTN
11 TRANSMISSION/ RECEPTION UNIT
12 DETERMINATION UNIT
13 DISTRIBUTION UNIT
14 GENERATION UNIT
15 STORAGE UNIT
16 REQUEST UNIT

3 RECEPTION-SIDE DTN
31 TRANSMISSION/ RECEPTION UNIT
32 DETERMINATION UNIT
33 COLLECTION UNIT
34 RESTORATION UNIT
35 STORAGE UNIT
36 FIRST MONITORING UNIT
37 SECOND MONITORING UNIT

9 NW MANAGEMENT DEVICE

7 REMOTE COMPUTER
71 REQUEST UNIT
72 CALCULATION UNIT
73 STORAGE UNIT

DATA TRANSFER SYSTEM, DATA TRANSFER DEVICE, AND DATA TRANSFER METHOD

CROSS-REFERENCE TO RELATED APPLICATIONS

This application is a National Stage application under 35 U.S.C. § 371 of International Application No. PCT/JP2022/002040, having an International Filing Date of Jan. 20, 2022. The disclosure of the prior application is considered part of the disclosure of this application, and is incorporated by reference in its entirety into this application.

TECHNICAL FIELD

The present invention relates to a data transfer system, a data transfer device, a data transfer method, and a data transfer program.

BACKGROUND ART

With recent development of a high performance computing (HPC) technology and a sensor technology, in technical fields such as high energy physics, astronomy, geophysics, and biology, a technology is required in which enormous data is generated from a sensor or a simulator and the data is quickly analyzed. For example, in a fusion reactor experiment of ITER, data of 50 GByte/sec is generated in the future, and analysis of the data is performed in participating countries and participating regions of the ITER project. At this time, a data generation place and a data analysis place are geographically far from each other, and it is necessary to transfer enormous data generated from a sensor or a simulator to the data analysis place at high speed.

In a conventional system, data (hereinafter, also referred to as a file) occurring in a data source is transferred to a remote super-computer (SC) and analyzed. Sensor information and a simulation result are generated in the data source. Data generated in the data source is stored in the data source, or transmitted to a temporary storage of a transmission-side data transfer node (DTN) in order to transmit data and stored therein. The transmission-side DIN transfers data stored in the temporary storage to a facing-side DTN. An FTP protocol is used for data transfer. In a case where encryption or compression is performed on data, a reception-side DTN performs decryption or decompression on the data and then transfers the received data to the remote SC.

Data to be generated in data source may occur in a burst manner, and a large amount of data is generated at a speed higher than a data transmission speed between DTNs at a certain time. For example, data is generated at a speed greater than or equal to 100 Gbps with respect to a transmission speed of 100 Gbps. As a use case in which data generation speed is higher than data transmission speed, many cases are assumed such as a smart city and communication with a satellite.

With development of optical network technology, a communication network between DTNs has achieved performance of several hundred Gbps-class even over a long distance such as across continents. However, in a case where delay of the communication network is large with respect to the data generation speed, and on the other hand, a band of the communication network is larger than a general band, it is difficult to implement data transfer that can make best use of the band of the communication network.

That is, in a communication network of several tens of Gbps-class, in a case where a protocol that ensures packet arrival such as TCP is simply used, it is difficult to fill a band, that is, to achieve a wire rate. In a case where a file group having many small files is transferred in file transfer using TCP such as FTP, desired transfer performance is not obtained due to a characteristic of slow start of TCP or exhaustion of the number of available TCP sessions. Also in a case where UDP is simply used, a mechanism such as hardware offloading of a network interface card (NIC) cannot be used, and thus it is difficult to obtain a wire rate.

In addition, as a method of distributing the stored data to a remote place, there is a method of quickly responding to a request from a user by storing data having a high possibility of being used near the user of a use destination, such as a content delivery network (CDN). However, in a system in which data generation processing and data transfer processing are simultaneously performed, it is not possible to speed up the transfer even if the similar method is adopted.

Thus, a method has been proposed of consolidating a plurality of small files into one large file, dividing the file into a parallelizable number of files, and performing data transfer (see Non Patent Literatures 1 and 2).

CITATION LIST

Non Patent Literature

Non Patent Literature 1: Mehmet Balman, and eight others, "Experiences with 100 Gbps Network Applications", In Proceedings of the fifth international workshop on Data-Intensive Distributed Computing Date, June 2012, p. 33-p. 42.

Non Patent Literature 2: Kenjiro Yamanaka, and eight others, "High-performance data transfer for full data replication between iter and the remote experimentation centre", Fusion Engineering and Design 138, 2019, p. 202-p. 209

SUMMARY OF INVENTION

Technical Problem (First Problem)

In particular, in a case of a long distance, it is not simple to implement 100 Gbps-class file transfer from the data source to the remote SC. Non Patent Literatures 1 and 2 propose a method of consolidating small files into a large file and transferring the file; however, since transferring is started after all files are generated, it is necessary to wait to perform file transfer until file generation ends, and a delay occurs in the file transfer.

(Second Problem)

In a case of a short distance, there is a possibility that it is possible to achieve a transfer speed of 100 Gbps-class without consolidating files, but there is no guarantee that a file desired to be calculated first is transferred first. In this regard, in the remote SC, since a file desired to be displayed is determined or predicted to some extent, a priority of a file to be transmitted first should be determined. In a case where a data generation speed in the data source is higher than a data transfer speed between DTNs, it is necessary to consider the priority.

Object of Invention

The present invention has been made in view of the above circumstances, and an object of the present invention is to provide a technology capable of transferring data generated at high speed and in a large amount at high speed, and starting analysis calculation of the data quickly.

Solution to Problem

A data transfer system of one aspect of the present invention is a data transfer system including: a transmission-side data transfer device that bundles and transmits a plurality of pieces of data generated by a data generator; and a reception-side data transfer device that receives and transmits a bundle of the pieces of data to a remote computer, in which the transmission-side data transfer device includes: a distribution unit that respectively distributes the plurality of pieces of data generated by the data generator to distribution destinations having priorities corresponding to priorities of the respective pieces of data in accordance with the priorities of the pieces of data; a generation unit that consolidates a plurality of pieces of data respectively distributed to the distribution destinations into each chunk having a size greater than or equal to a certain size, in order from one of the distribution destinations having a high priority; and a transmission unit that transmits each of the chunks to the reception-side data transfer device at a timing when the plurality of pieces of data is consolidated into each of the chunks, and the reception-side data transfer device includes a determination unit that determines the priorities of the pieces of data depending on usage situations of the pieces of data in the remote computer.

A data transfer device of one aspect of the present invention includes: a distribution unit that respectively distributes a plurality of pieces of data generated by a data generator to distribution destinations having priorities corresponding to priorities of the respective pieces of data in accordance with the priorities of the pieces of data determined depending on usage situations of the pieces of data in a remote computer; a generation unit that consolidates a plurality of pieces of data respectively distributed to the distribution destinations into each chunk having a size greater than or equal to a certain size, in order from one of the distribution destinations having a high priority; and a transmission unit that transmits each of the chunks to a data transfer device at a timing when the plurality of pieces of data is consolidated into each of the chunks.

A data transfer method of one aspect of the present invention is a data transfer method performed by a data transfer device, the data transfer method including: a step of respectively distributing a plurality of pieces of data generated by a data generator to distribution destinations having priorities corresponding to priorities of the respective pieces of data in accordance with the priorities of the pieces of data determined depending on usage situations of the pieces of data in a remote computer; a step of consolidating a plurality of pieces of data respectively distributed to the distribution destinations into each chunk having a size greater than or equal to a certain size, in order from one of the distribution destinations having a high priority; and a step of transmitting each of the chunks to a data transfer device at a timing when the plurality of pieces of data is consolidated into each of the chunks.

A data transfer program of one aspect of the present invention causes a computer to function as the data transfer device described above.

Advantageous Effects of Invention

According to the present invention, it is possible to provide a technology capable of transferring data generated at high speed and in a large amount at high speed, and starting analysis calculation of the data quickly.

BRIEF DESCRIPTION OF DRAWINGS

FIG. 3 is a sequence diagram illustrating a data transfer method according to the first embodiment.

FIG. 5 is a processing diagram illustrating a chunk generation method according to the first embodiment.

FIG. 10 is a diagram illustrating an overall configuration of a data transfer system according to the modified example of FIG. 9.

FIG. 11 is a sequence diagram illustrating a data transfer method according to the modified example of FIG. 9.

FIG. 12 is a diagram illustrating an outline of an invention according to a second embodiment.

FIG. 16 is a diagram illustrating an overall configuration of a data transfer system according to the third embodiment.

DESCRIPTION OF EMBODIMENTS

Figure 1:
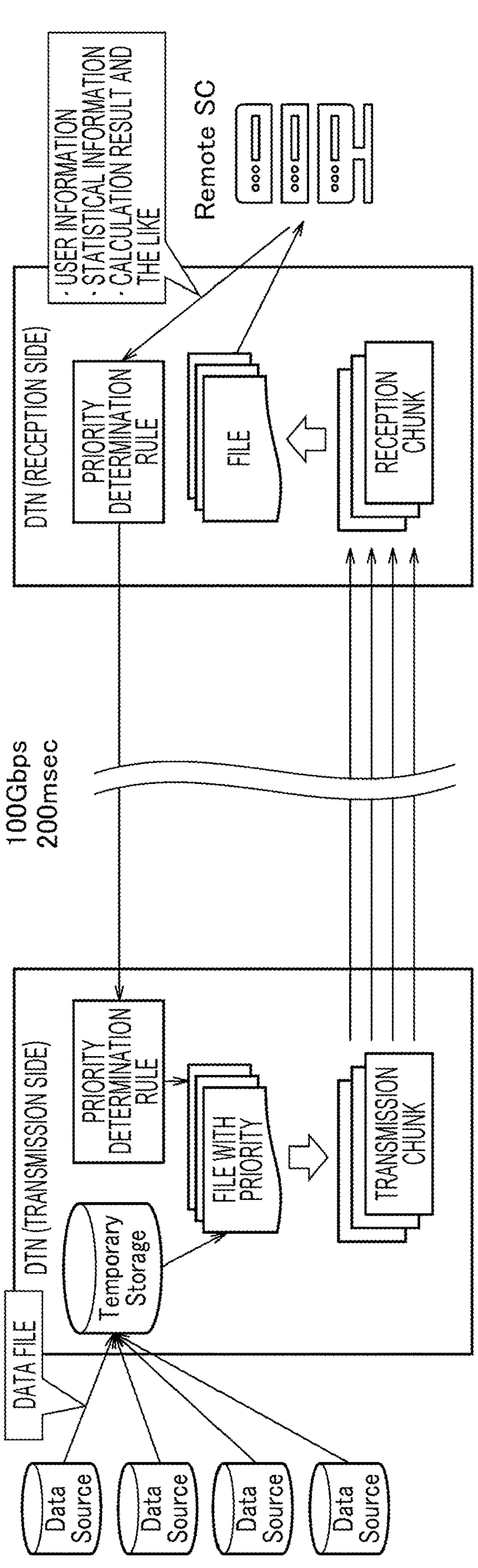
FIG. 1 is a diagram illustrating an outline of an invention according to a first embodiment.

Hereinafter, embodiments of the present invention will be described with reference to the drawings. In the drawings, the same portions are denoted by the same reference signs, and description thereof is omitted.

Summary of Invention

For the first problem, the present invention is characterized in that data is transferred in units of chunks having a size greater than or equal to a certain size at a stage where the data is generated to some extent without waiting for generation of all the data. If a chunk can be generated, transferring can be started, so that data transfer can be started before all the data are prepared.

For the second problem, the present invention is characterized in that when a chunk is generated, pieces of data are consolidated in descending order of priority determined by an order in which calculation is performed by the remote SC, an order in which calculation is predicted to be performed, or the like. By consolidating and transferring data having a high priority first, it is possible to start analysis calculation of the data quickly.

In this regard, the present invention is characterized in that a data priority is determined in advance on the basis of statistical information such as a past data usage situation, setting by human input, or the like. In ITER and simulation experiments, experiments for generating large data and calculations for analyzing results are repeatedly performed by changing various parameters. Data used in past analysis is highly likely to be used in next analysis, and it is possible to shorten an analysis calculation time of data by determining the data priority depending on the past data usage situation.

The present invention has further features as described below in addition to the above three features.

The present invention is characterized in that high priority data is transmitted to a reception-side DTN in advance before a data request is received from the remote SC. By storing data having a high possibility of being used near a user of a use destination, it is possible to quickly respond to a request from the user, and the data can be immediately used in a case where the data is desired to be used.

The present invention is characterized in that the data priority is dynamically changed when data analysis calculation in the remote SC is changed. In a case where the data priority is determined in advance by statistical processing or the like, there is a case where a calculation order desired to be actually performed does not match the priority; however, by dynamically changing the data priority, it is possible to alleviate a delay of the start of the analysis calculation due to the mismatch.

The present invention is characterized in that a state of a communication network is monitored or the state of the communication network is acquired from a network management device, and the data priority is dynamically changed when congestion or the like occurs. For example, in a case where a band of the communication network is narrowed down, only essential data is transmitted or data having a low priority is discarded. By dynamically changing the data priority depending on the state of the communication network, even in a case where the band of the communication network is limited due to congestion or the like and all data cannot be transferred, it is possible to reliably transfer essential data.

The present invention is characterized in that a state of the remote SC is monitored, and the number of chunks to be transmitted to the reception-side DIN is adjusted depending on a use situation of a calculation resource in the remote SC. For example, in a case where chunks exceeding the calculation resource of the remote SC are transferred, the number of chunks is reduced. By adjusting the number of chunks depending on the state of the remote SC, it is possible to execute analysis calculation of data in a desired time.

The present invention is characterized in that highest priority data having a highest priority among a plurality of priorities is transmitted as it is exceptionally without processing of performing consolidation into a chunk having a size greater than or equal to a certain size described above. Since there is no delay due to the processing of consolidating data into a chunk, the highest priority data can be transferred at a highest speed.

First Embodiment

Summary of Invention

FIG. 1 is a diagram illustrating an outline of an invention according to a first embodiment.

In the first embodiment, a transmission-side DTN manages data (also referred to as a file) generated by a data source in a temporary storage, and transfers the file to a reception-side DTN in accordance with a priority determination rule indicating a priority of the file. At this time, in order to improve file transfer performance, the transmission-side DTN consolidates files generated in the data source into a chunk (transmission chunk) having a size greater than or equal to a certain size and transfers the chunk.

That is, in the first embodiment, files are consolidated in order from a file having a high priority among a plurality of files into each chunk having a size greater than or equal to a certain size and transferred. Since the files are consolidated into each chunk and transferred, file transfer can be started without waiting for the end of all file generation, and a delay of the file transfer can be reduced. In addition, since the files are consolidated in order from a file having a high priority, a file with a high priority can be delivered to the remote SC quickly, and analysis calculation of data can be started quickly.

Overall System Configuration

Figure 2:
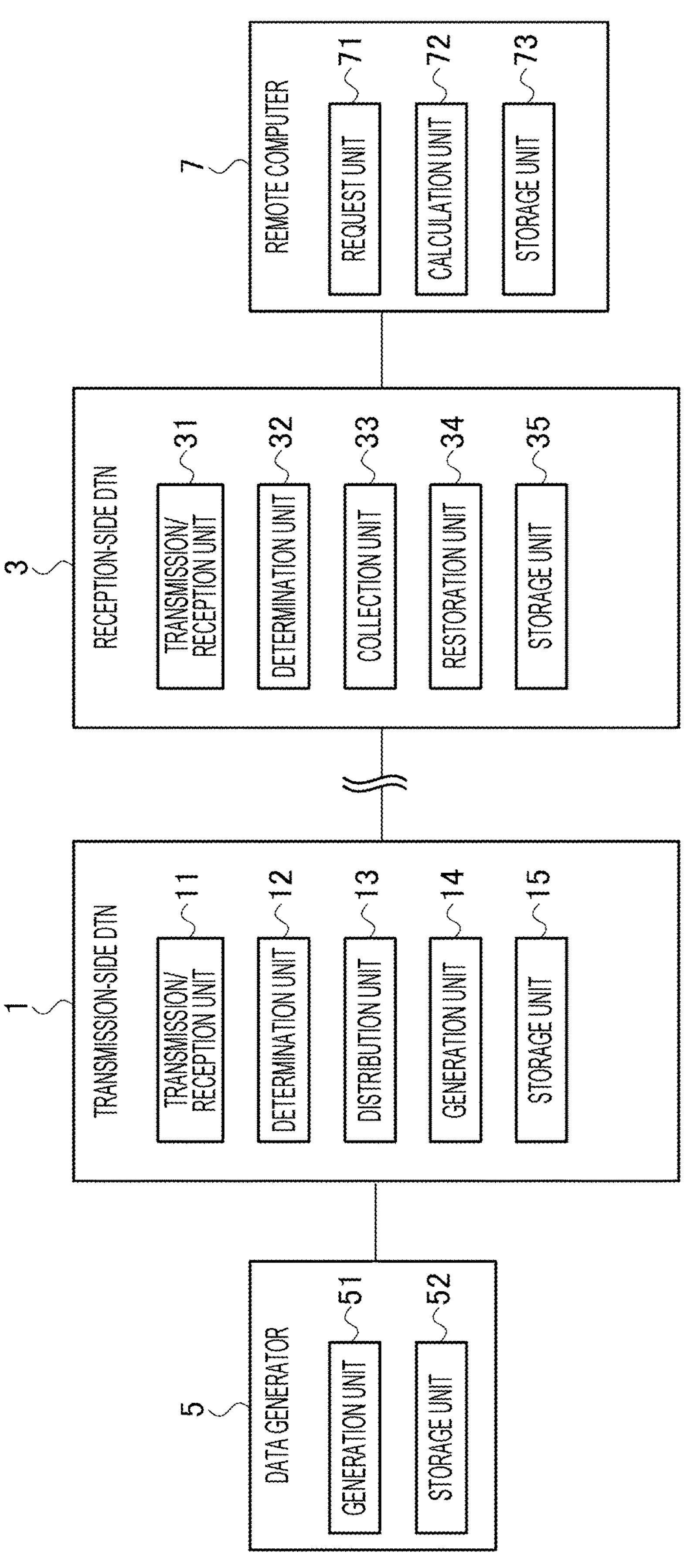
FIG. 2 is a diagram illustrating an overall configuration of a data transfer system according to the first embodiment.

FIG. 2 is a diagram illustrating an overall configuration of a data transfer system according to the first embodiment. The data transfer system includes a transmission-side DTN 1, a reception-side DTN 3, a data generator 5, and a remote computer 7.

Function of Transmission-Side DTN 1

The transmission-side DTN 1 is a transmission-side data transfer device that bundles and transmits a plurality of pieces of data generated by the data generator 5. The transmission-side DTN 1 includes a transmission/reception unit 11, a determination unit 12, a distribution unit 13, a generation unit 14, and a storage unit 15.

Function of Transmission/Reception Unit 11

The transmission/reception unit 11 has a function of receiving a priority determination rule transmitted from the reception-side DTN 3. In addition, the transmission/reception unit 11 has a function of receiving the plurality of pieces of data generated by the data generator 5. Further, the transmission/reception unit 11 has a function of transmitting each chunk to the reception-side DTN 3 at a timing when the plurality of pieces of data is consolidated into each of the chunks. Further, the transmission/reception unit 11 has a function of transmitting data having a high priority to the reception-side DTN 3 before receiving a request for data from the reception-side DTN 3.

The transmission/reception unit 11 transfers the chunk by using a protocol such as UDP, TCP, FTP, GridFTP, or MMCFTP. The transmission/reception unit 11 may transfer the chunk by using a protocol such as remote direct memory access (RDMA) instead of FTP-based protocols. The transmission/reception unit 11 may use a unique protocol instead of existing protocols.

The transmission/reception unit 11 may perform chunk transfers in parallel. For example, the transmission/reception unit 11 may parallelize and transfer one chunk into a plurality of chunks, or may transfer a plurality of chunks in parallel.

The transmission/reception unit 11 may perform quality of service (QoS) control, encryption, compression, and the like at the time of chunk transfer. In a case where communication other than the chunk also flows to the communication network for the chunk transfer, the transmission/reception unit 11 may perform a shaper at the time of the chunk transfer. In the distribution unit 13, in a case where the same algorithm as a packet scheduler is used in a queue with priority, the shaper can be combined (see Reference Literatures 1 and 2).

Reference Literature 1; Anirudh Sivaraman, and nine others, "Programmable packet scheduling at line rate", In Proceedings of the 2016 ACM SIGCOMM Conference, p. 44-p. 57.

Reference Literature 2; Ahmed Saeed, and six others, "Eiffel: Efficient and flexible software packet scheduling", In 16th {USENIX} Symposium on Networked Systems Design and Implementation ({NSDI} 19), 2019, p. 17-p. 32.

Function of Determination Unit 12

The determination unit 12 has a function of respectively determining priorities of the plurality of pieces of data generated by the data generator 5 in accordance with priorities of the respective pieces of data indicated in the priority determination rule, and respectively assigning the priorities to the respective pieces of data.

Function of Distribution Unit 13

The distribution unit 13 has a function of respectively distributing the plurality of pieces of data to which the priorities are assigned to distribution destinations having priorities corresponding to the priorities of the respective pieces of data. For example, the distribution unit 13 stores a file or a pointer of the file in a queue with priority in accordance with a priority determined by the determination unit 12. In a case where the pointer of the file is stored in the queue with priority, a file body is stored in the storage unit 15.

The distribution unit 13 can apply any algorithm to a queue with priority or a scheduler for file distribution. The distribution unit 13 may use a queue with priority using a tree structure such as a heap tree. The distribution unit 13 may use an algorithm and an implementation method (Push-In-First-Out, Eiffel, or the like) introduced as a packet scheduler. The distribution unit 13 may set a finite stage priority as introduced as Eiffel, and prepare a queue for each priority. The distribution unit 13 may use a circular FFS-based queue. The distribution unit 13 may use an approximation algorithm or a tree structure so as to find a queue with a high priority (see Reference Literatures 1 and 2).

Function of Generation Unit 14

The generation unit 14 has a function of respectively generating a plurality of chunks having a data size greater than or equal to a certain size by consolidating a plurality of pieces of data respectively distributed to the distribution destinations into each chunk having a size greater than or equal to a certain size, in order from one of the distribution destinations having a high priority. For example, the generation unit 14 extracts a plurality of pieces of data stored in a queue with priority or the storage unit 15 in accordance with a priority and generates a chunk.

The generation unit 14 may extract data in descending order of priority, or may collect data having the same priority by a certain size to generate a chunk when the data having the same priority is accumulated by a certain amount or more, or when a preset time comes. In a case where the size of extracted data is larger than the size of the chunk, the generation unit 14 may divide the data into a plurality of pieces and generate a plurality of chunks for one piece of data.

Function of Storage Unit 15

The storage unit 15 has a function of storing a plurality of pieces of data transmitted from the data generator 5. The storage unit 15 may be inside the transmission-side DTN 1, or outside the transmission-side DTN 1.

For example, the storage unit 15 is a RAMDisk or a nonvolatile memory having a high reading/writing speed. The storage unit 15 may be a storage device having a storage structure in which a device having a high cost per unit capacity but a high reading/writing speed, a device having a low cost per unit capacity but a relatively slow reading/writing, or the like is formed in a plurality of layers. The storage unit 15 may be an external high-speed storage using NVM Express over Fabrics (NVMe-oF) or the like. The storage unit 15 may be a distributed file system such as Ceph, Google File System, or Gfarm (see Reference Literatures 3 to 5).

Reference Literature 3; Sage A. Weil, and four others, "Ceph: A scalable, high-performance distributed file system", In Proceedings of the 7th symposium on Operating systems design and implementation, November 2006, p. 307-p. 320.

Reference Literature 4; Sanjay Ghemawat, and two others, "The Google file system", In Proceedings of the nineteenth ACM symposium on Operating systems principles, p. 29-p. 43.

Reference Literature 5; Osamu TATEBE and four others "Grid Datafarm Architecture for Global Petascale Data-intensive Computing", Journal of Information Processing Society of Japan: High Performance Computing System, Information Processing Society of Japan Vol. 43, No. SIG 6 (HPS5), September 2002, p. 184-p. 195.

Function of Reception-Side DTN 3

The reception-side DTN 3 is a reception-side data transfer device that receives a bundle of data from the transmission-side DTN 1, restores the bundle of data, performs expansion (decryption, decompression, or the like) of the bundle of data as necessary, and transmits the bundle to the remote computer 7. The reception-side DTN 3 includes a transmission/reception unit 31, a determination unit 32, a collection unit 33, a restoration unit 34, and a storage unit 35.

Function of Transmission/Reception Unit 31

The transmission/reception unit 31 has a function of transmitting a priority determination rule to the transmission-side DTN 1. In addition, the transmission/reception unit 31 has a function of receiving a chunk transmitted from the transmission-side DTN 1.

Function of Determination Unit 32

The determination unit 32 has a function of respectively determining priorities of the respective pieces of data depending on usage situations of the pieces of data in the remote computer 7 on the basis of information collected from the remote computer 7, and generating a priority determination rule indicating the priorities of the respective pieces of data. In addition, the determination unit 32 has a function of changing the priorities of the respective pieces of data depending on a change in a calculation content in the remote computer 7.

For example, the determination unit 32 performs statistical processing or the like of data from a data usage record of the user, and determines the priorities of the respective pieces of data on the basis of a title, attribute, generation time, generation place, content, or the like of a file. In a case where simulations or experiments are repeated, the determination unit 32 may determine the priorities of the respective pieces of data by using statistical processing such as deep learning or machine learning by using the past data usage situation.

The determination unit 32 may set a priority of a file with a close request deadline as a highest priority, as in Earliest Deadline First (EDF) scheduling. In a case where a certain period of time has elapsed and a value of a file is lost, the determination unit 32 may set a priority of the file to the lowest priority or no priority, and discard the file without performing file transfer.

Function of Collection Unit 33

The collection unit 33 has a function of collecting information necessary for determining a priority determination rule from the remote computer 7.

Function of Restoration Unit 34

The restoration unit 34 has a function of extracting a plurality of pieces of data from the chunk transmitted from the transmission-side DTN 1, and storing the plurality of pieces of data in the storage unit 35.

Function of Storage Unit 35

The storage unit 35 has a function of storing a plurality of pieces of data.

Configuration of Data Generator 5

The data generator 5 is one or more data sources. The data generator 5 includes a generation unit 51 and a storage unit 52. The generation unit 51 has a function of generating data, storing the data in the storage unit 52, and transmitting the data to the transmission-side DTN 1. For example, the generation unit 51 is a supercomputer or a sensor. A plurality of generation units 51 may be provided. The storage unit 52 has a function of storing data.

Configuration of Remote Computer 7

The remote computer 7 is one or more remote SCs. The remote computer 7 includes a request unit 71 that requests data from the reception-side DTN 3, a calculation unit 72 that performs analysis calculation on the data, and a storage unit 73 that stores the data and a result of analysis of the data.

Data Transfer Method

FIG. 3 is a sequence diagram illustrating a data transfer method according to the first embodiment.

Step S101;

First, in the reception-side DTN 3, the collection unit 33 collects information necessary for determining a priority determination rule from the remote computer 7. For example, the collection unit 33 collects data user information, data usage statistical information, a data calculation result, a data calculation intermediate result, other past data, and the like.

Step S102;

Next, on the basis of the information collected from the remote computer 7, the determination unit 32 respectively determines priorities of the respective pieces of data generated by the data generator 5 depending on the usage situation of the pieces of data in the remote computer 7, and generates a priority determination rule indicating the priorities of the respective pieces of data.

At this time, the determination unit 32 may determine priorities of the respective pieces of data set in advance by the user as the priorities of the respective pieces of data as they are. The determination unit 32 may determine the priorities of the respective pieces of data by using a neural network, machine learning, or the like. The determination unit 32 may determine overall priorities that do not depend on users, or may respectively determine priorities of the respective pieces of data for each user.

Step S103;

Next, the transmission/reception unit 31 transmits the priority determination rule to the transmission-side DTN 1 via the communication network.

Step S104;

On the other hand, in the data generator 5, the generation unit 51 generates data. The generation unit 51 is a sensor, a simulator, or the like, and generates data desired to be calculated by the remote computer 7. Formats of the data include files and the like.

Step S105;

Next, the generation unit 51 sequentially transmits a file to the transmission-side DTN 1 every time the file is generated. At this time, the generation unit 51 may store the file in the storage unit 52. The storage unit 52 may be inside the data generator 5 or outside the data generator 5.

Step S106;

Next, in the transmission-side DTN 1, the transmission/reception unit 11 sequentially receives respective files transmitted from the data generator 5. Thereafter, the determination unit 12 respectively determines priorities of the respective files in accordance with the priority determination rule from the reception-side DTN 3, and assigns the priorities to the respective pieces of data.

Step S107;

Next, the distribution unit 13 respectively distributes the files to which the priorities are assigned to distribution destinations having priorities corresponding to the priorities of the respective files. Specifically, the distribution unit 13 utilizes a data structure such as a queue with priority so that files can be extracted in order of priority, and stores each file in the queue with priority. At this time, the distribution unit 13 may store a pointer of the file in the queue with priority.

Step S108;

Next, the generation unit 14 sequentially extracts files from each distribution destination in descending order of priority, and consolidates the extracted respective files into each chunk having a certain size. As a result, a plurality of chunks (transmission chunks for transmission) is generated in which one or more files are stored. Note that the chunk is a set of files collected in a certain large size to achieve high speed.

At this time, the generation unit 14 may extract files in descending order of priority to generate a chunk, or may collect files having the same priority by a certain size to generate a chunk when the files having the same priority are accumulated by a certain amount or more, or when a preset time comes. In a case where the size of an extracted file is larger than the size of the chunk, the generation unit 14 may divide the file into a plurality of pieces and generate a plurality of chunks for one file. The generation unit 14 may compress a file to generate a chunk.

Figure 4:
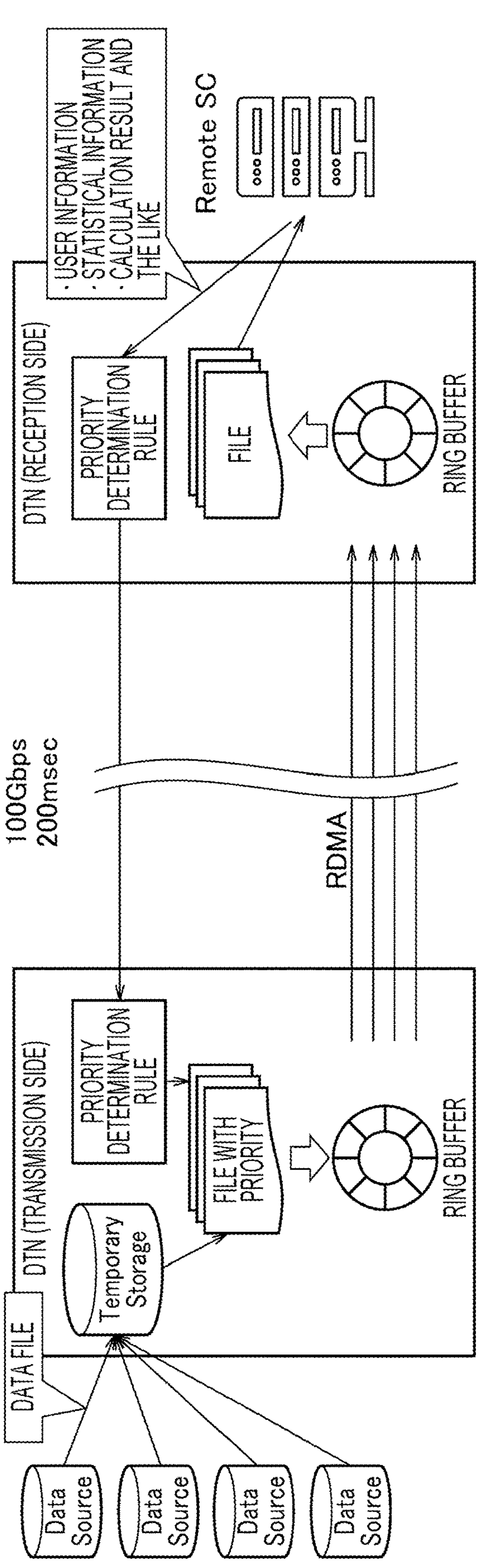
FIG. 4 is a diagram illustrating a file transfer method according to the first embodiment.

Step S109;

Next, the transmission/reception unit 11 transmits each of the chunks to the reception-side DTN 3 via the communication network at a timing when the files are consolidated into each of the chunks. At this time, the transmission/reception unit 11 may transfer a plurality of chunks in parallel by using a communication means utilizing a plurality of sessions of TCP, such as GridFTP or MMCFTP, or may transfer the plurality of chunks by using UDP, RDMA, or the like. In a case where RDMA is used, the transmission/reception unit 11 may expand the chunk on a memory and perform file transfer using a data structure such as a ring buffer as illustrated in FIG. 4. The transmission/reception unit 11 may perform the file transfer by batch processing.

Step S110;

Next, in the reception-side DTN 3, the transmission/reception unit 31 receives each chunk transmitted from the transmission-side DTN 1. Thereafter, the restoration unit 34 extracts the file from each of the chunks. At this time, in a case where encryption or compression is performed on the file, the restoration unit 34 performs decryption or decompression of the file.

Step S111;

Finally, the restoration unit 34 stores the files respectively extracted from the chunks in the storage unit 35. Then, at the same time as extracting the file from the chunk, or when receiving a file request from the remote computer 7, the transmission/reception unit 31 transmits the file to the remote computer 7. The reception-side DTN 3 may perform only one of file storage and file transmission, or may perform both.

Chunk Generation Method

FIG. 5 is a processing diagram illustrating a chunk generation method.

Step S201;

First, the transmission-side DTN 1 reads each file transmitted from the data generator 5. For example, a word indicating a priority is input to a file name of data generated by the data generator 5. Specifically, a word "low" is input to a file name of temperature sensor data, and a word "high" is input to a file name of pressure sensor data.

Step S202;

Next, the transmission-side DTN 1 respectively determines priorities of the files in accordance with data priorities determined depending on usage situations of the pieces of data, and assigns the priorities to the respective files. The priority of the file is determined by, for example, the file name.

Step S203;

Next, the transmission-side DTN 1 respectively distributes the files to distribution destinations having priorities corresponding to the priorities of the respective files, and consolidates the files into each chunk having a certain size in descending order of priority.

Step S204;

Finally, the transmission-side DTN 1 respectively stores the chunks in queues of corresponding priorities, and transmits the chunks to the reception-side DTN 3 in order from a chunk stored in a queue having a high priority. Specifically, the transmission-side DTN 1 stores a chunk having a high priority in a high priority queue. Since the high priority queue generally has a large queue size, it is possible to make it difficult to discard the chunk. For that reason, the number of chunks that can be transmitted per unit time increases and can be transmitted with low delay. On the other hand, the chunk having a low priority is stored in a low priority queue.

Chunk Transmission Method

Figure 6:
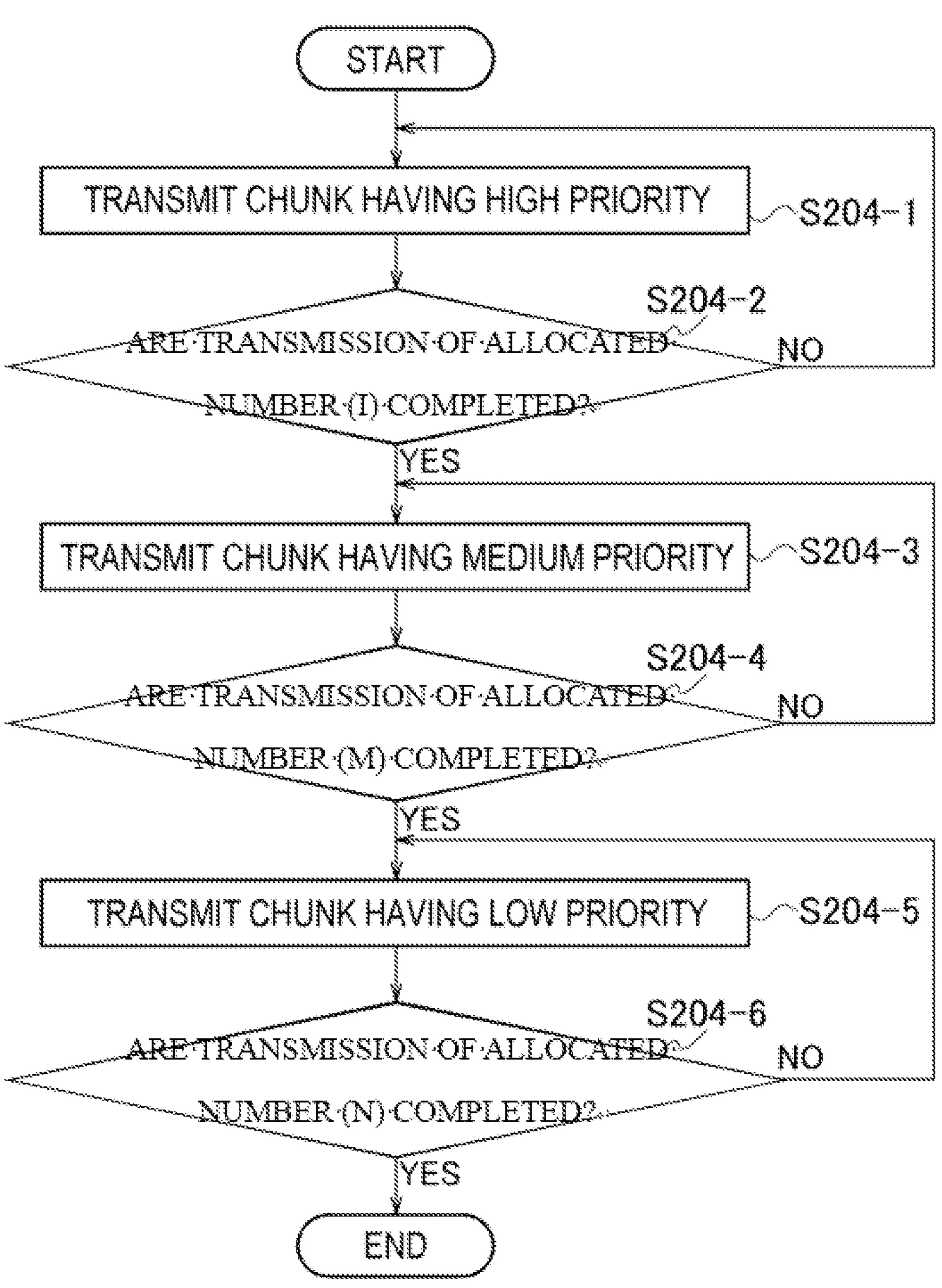
FIG. 6 is a flow diagram illustrating a chunk transmission method according to the first embodiment.

FIG. 6 is a flow diagram illustrating a chunk transmission method.

Steps S204-1 and S204-2;

First, the transmission-side DTN 1 repeats transmission of each chunk having a high priority stored in the high priority queue until an allocated number I allocated for the high priority is reached.

Steps S204-3 and S204-4;

Next, in a case where the number of transmissions of the chunk having the high priority reaches I, the transmission-side DTN 1 repeats transmission of each chunk having a medium priority stored in a medium priority queue until an allocated number M allocated for the medium priority is reached.

Steps S204-5 and S204-6;

Finally, in a case where the number of transmissions of the chunk having the medium priority reaches M, the transmission-side DTN 1 repeats transmission of each chunk having a low priority stored in the low priority queue until an allocated number N allocated to the low priority is reached.

Note that the number of priority classes is not limited to three, and is only required to be two or more.

Data Acquisition Method

Figure 7:
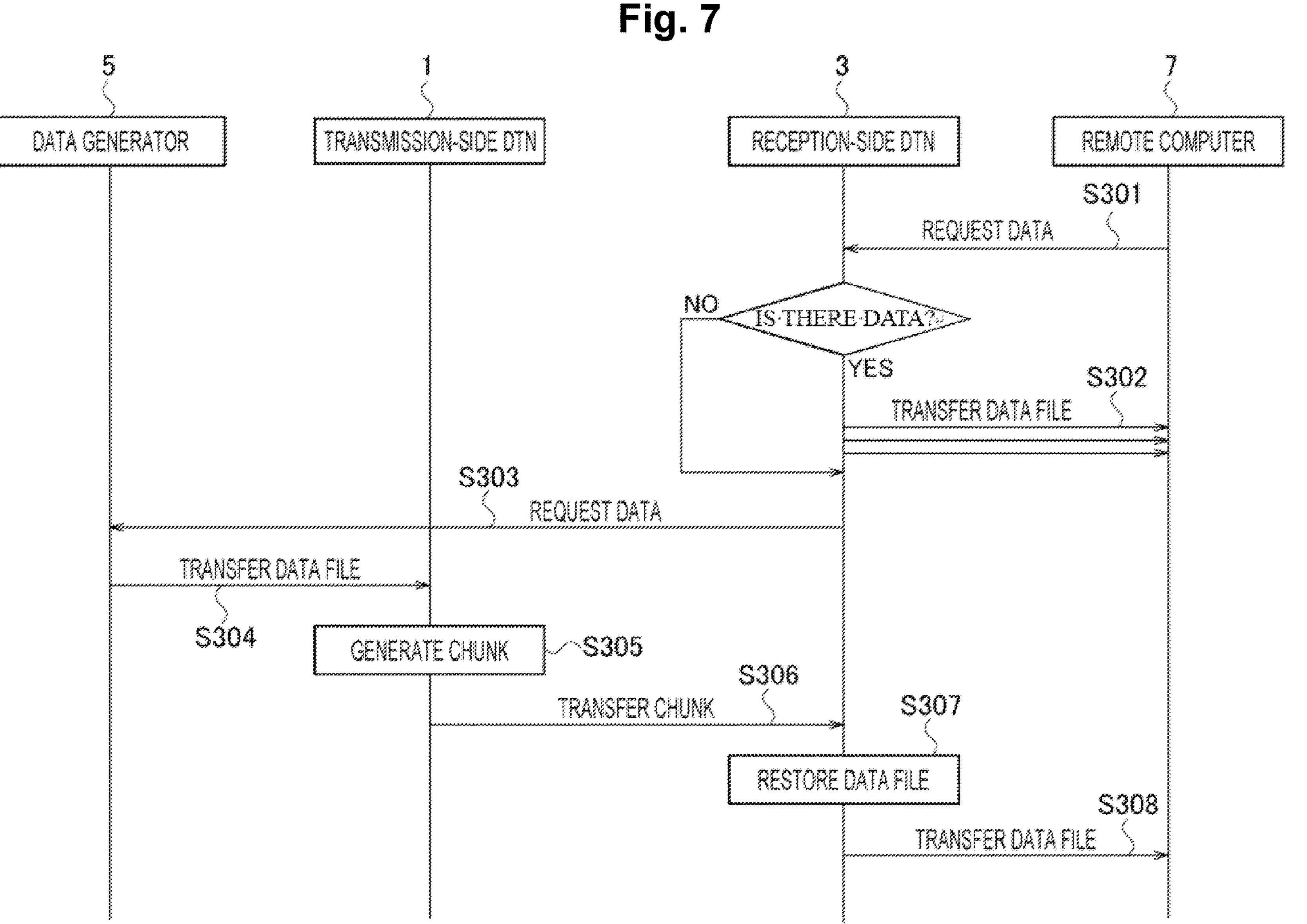
FIG. 7 is a sequence diagram illustrating a data acquisition method according to the first embodiment.

FIG. 7 is a sequence diagram illustrating a data acquisition method.

Step S301;

First, in the remote computer 7, the request unit 71 requests data from the reception-side DTN 3.

Step S302;

Next, in the reception-side DTN 3, in a case where the data requested from the remote computer 7 is stored in the storage unit 35, the transmission/reception unit 31 transmits the data to the remote computer 7.

Step S303;

On the other hand, in the reception-side DTN 3, in a case where the data requested from the remote computer 7 is not stored in the storage unit 35, the transmission/reception unit 31 requests the data from the data generator 5 via the transmission-side DTN 1.

Step S304;

Next, in the data generator 5, the generation unit 51 reads a file of the data requested from the remote computer 7 from the storage unit 52, and transmits the file to the transmission-side DTN 1. In a case where the file is not in the storage unit 52, the generation unit 51 generates the file and transmits the file to the transmission-side DTN 1.

Step S305;

Next, in the transmission-side DTN 1, the generation unit 14 generates a chunk of the file transmitted from the data generator 5.

Step S306;

Next, the transmission/reception unit 11 transmits the chunk to the reception-side DTN 3 via the communication network.

Step S307;

Thereafter, in the reception-side DTN 3, the restoration unit 34 extracts the file from the chunk transmitted from the transmission-side DTN 1.

Step S308;

Finally, the transmission/reception unit 31 transmits the file to the remote computer 7 as a request source.

Note that the transmission/reception unit 11 of the transmission-side DTN 1 may transmit in advance, to the reception-side DTN 3, a file having a high priority that is likely to be required in the future at a time when data is generated by the data generator 5, before receiving a data request from the remote computer 7. At that time, a cache mechanism may be utilized capable of distributing data to a remote place, such as CDN.

Method of Changing Data Priority

Figure 8:
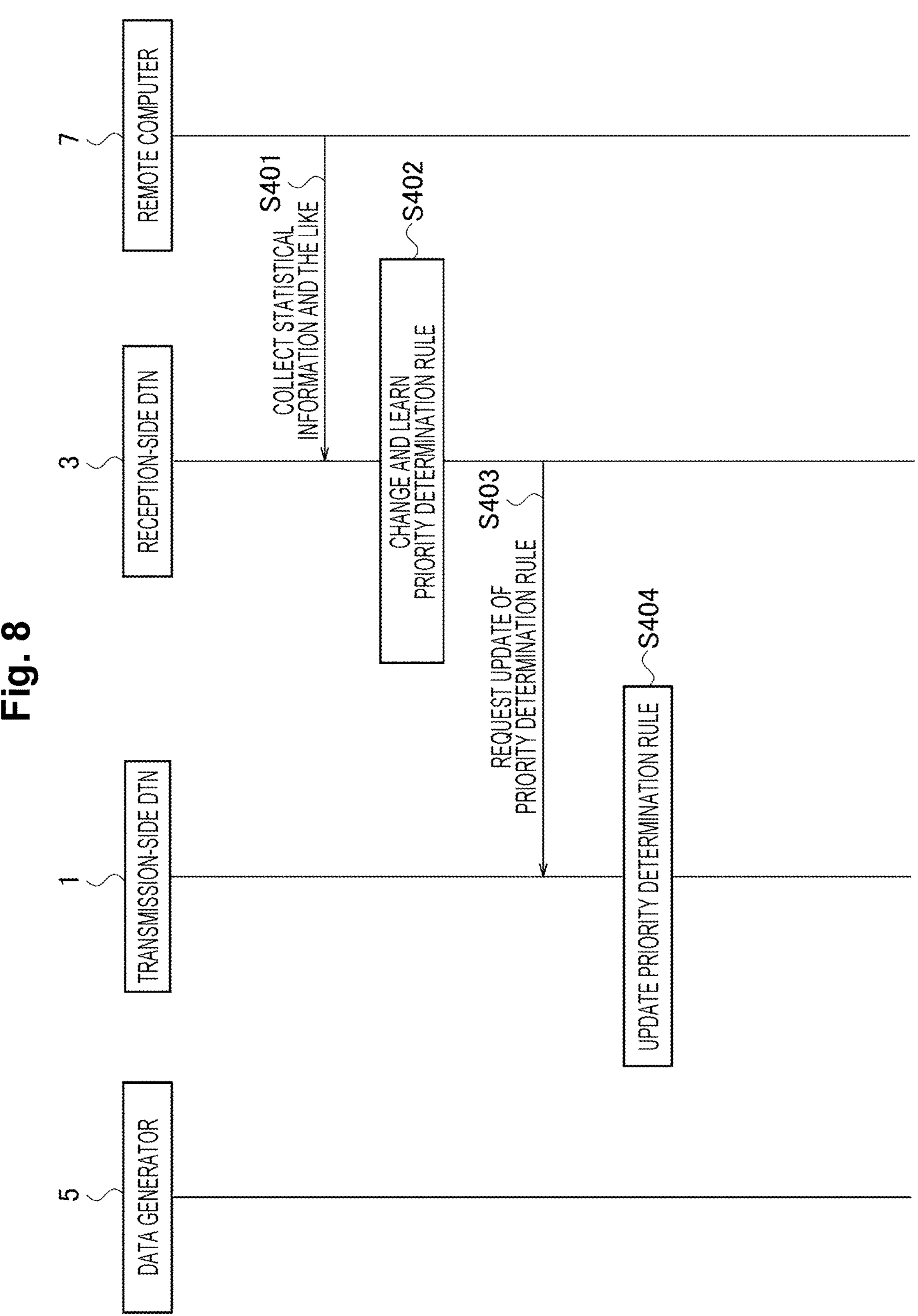
FIG. 8 is a sequence diagram illustrating a method of changing a data priority according to the first embodiment.

FIG. 8 is a sequence diagram illustrating a method of changing a data priority.

Step S401;

First, in the reception-side DTN 3, the collection unit 33 collects information necessary for determining a priority determination rule from the remote computer 7. For example, the collection unit 33 collects data user information, data usage statistical information, a data calculation result, a data calculation intermediate result, other past data, and the like.

Step S402;

Next, on the basis of the information collected from the remote computer 7, in a case where there is a change in the calculation content in the remote computer 7, the determination unit 32 changes the priorities of the pieces of data determined in step S102. For example, in a case where there is a change in a type of data necessary for analysis calculation, a use order of the data, a calculation method, and the like, the determination unit 32 changes the priorities of the pieces of data.

Step S403;

Next, the transmission/reception unit 31 transmits a priority determination rule indicating the priorities of the respective pieces of data after the change to the transmission-side DTN 1 via the communication network.

Step S404;

Finally, in the transmission-side DTN 1, the transmission/reception unit 11 updates the past priority determination rule with the priority determination rule after the change. Thereafter, the determination unit 12 determines the priority of the file transmitted from the data generator 5 in accordance with the priority determination rule after the update.

Effects

According to the first embodiment, since the transmission-side DTN 1 consolidates pieces of data into each chunk having a size greater than or equal to a certain size and transfers each of the chunks, data transfer can be started at a timing when data having a size greater than or equal to a chunk size is generated without waiting for the generation of all the data, and a delay of the data transfer can be reduced. In addition, since data is transmitted for each chunk having a size greater than or equal to a certain size, it is possible to avoid a problem that transfer performance is not obtained when there are many small pieces of data.

In addition, according to the first embodiment, since the transmission-side DTN 1 consolidates pieces of data from data having a high priority when generating a chunk, the data having a high priority can be delivered to the remote SC quickly, and analysis calculation can be started more quickly.

In addition, according to the first embodiment, since the reception-side DTN 3 changes the priorities of the pieces of data depending on the data usage situation in the remote SC, it is possible to cope with a case where data is used that does not match the priority, and it is possible to further increase certainty of the priority by utilizing the prior usage situation of the data, thereby making it possible to advance the analysis calculation in the remote SC with a lower delay.

In addition, according to the first embodiment, since the transmission-side DTN 1 transmits data having a high priority to the reception-side DTN 3 before receiving a request for data from the reception-side DTN 3, a file having a high possibility of being used can be stored near the user of the use destination, and thus, it is possible to quickly respond to a request from the user, to immediately use the file in a case where the file is desired to be used, thereby advancing analysis calculation by remote SC with a lower delay.

In addition, according to the first embodiment, since the reception-side DTN 3 changes the priorities of the pieces of data depending on the change of the calculation content in the remote SC, even in a case where the calculation order desired to be actually performed does not match the priority, it is possible to alleviate the delay of the start of the analysis calculation due to the mismatch.

Modified Example of First Embodiment

Figure 9:
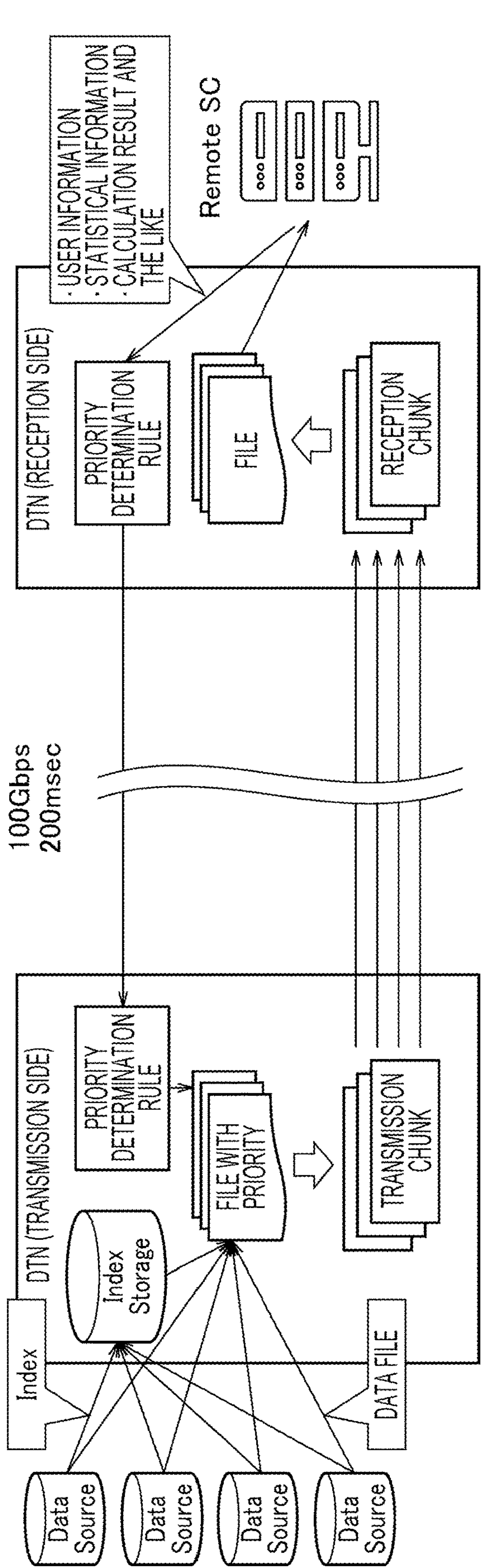
FIG. 9 is a diagram illustrating a modified example of the invention according to the first embodiment.

FIG. 9 is a diagram illustrating a modified example of the invention according to the first embodiment.

In the first embodiment, the file generated by the data source is managed by the temporary storage of the transmission-side DTN. On the other hand, in the modified example, the transmission-side DTN receives only an index of the data generated in the data source, manages the index in an index storage, and acquires a data body from the data source at the time of generating the chunk.

FIG. 10 is a diagram illustrating an overall configuration of a data transfer system according to the modified example.

In the modified example, the transmission-side DTN 1 further includes a request unit 16. The request unit 16 has a function of requesting the data body from the data generator 5.

In the modified example, the generation unit 51 of the data generator 5 has a function of generating data, storing the data in the storage unit 52, and transmitting only information of the data to the transmission-side DTN 1 in advance. In addition, the generation unit 51 has a function of transmitting the data body to the transmission-side DTN 1 in response to a request from the transmission-side DTN 1.

FIG. 11 is a sequence diagram illustrating a data transfer method according to the modified example.

Steps S501 to S504;

These steps are the same as steps S101 to S104.

Step S505;

Next, in the data generator 5, the generation unit 51 stores the file body in the storage unit 52 every time the file is generated, and sequentially transmits file information to the transmission-side DTN 1. The file information includes a file name, a data size, a generation time, sensor information, and the like.

Step S506;

Next, in the transmission-side DTN 1, the transmission/reception unit 11 sequentially receives pieces of file information transmitted from the data generator 5. Thereafter, the determination unit 12 determines each of priorities of the pieces of file information in accordance with the priority determination rule from the reception-side DTN 3, and respectively assigns the priorities to the pieces of data information.

Step S507;

Next, the distribution unit 13 respectively distributes the pieces of file information to which the priorities are assigned to distribution destinations having priorities corresponding to the priorities of the pieces of file information.

Step S508;

Next, the request unit 16 requests a file body corresponding to the file information of each distribution destination from the data generator 5 in descending order of priority.

Step S509;

Next, in the data generator 5, the generation unit 51 sequentially transmits respective file bodies requested from the transmission-side DTN 1 to the transmission-side DTN 1.

Step S510;

Next, in the transmission-side DTN 1, the generation unit 14 consolidates the file bodies transmitted from the data generator 5 into each chunk having a certain size.

Steps S511 to S513;

These steps are the same as steps S109 to S111.

Second Embodiment

FIG. 12 is a diagram illustrating an outline of an invention according to a second embodiment.

In the second embodiment, the reception-side DTN dynamically changes a data priority depending on a state of the communication network between DTNs. For that reason, even in a case where the band of the communication network is limited due to congestion or the like and all data cannot be transferred, it is possible to reliably transfer essential data.

Figure 13:
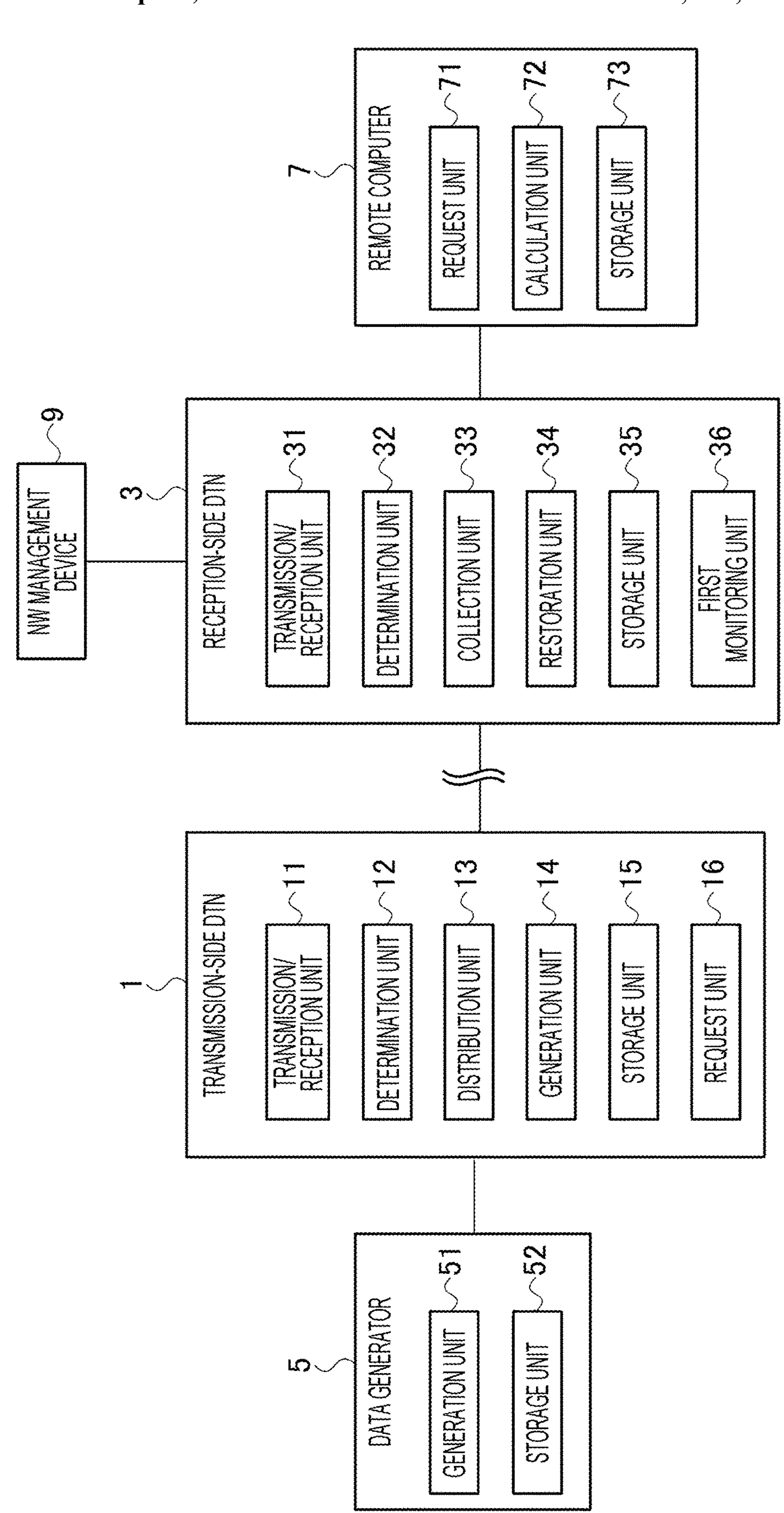
FIG. 13 is a diagram illustrating an overall configuration of a data transfer system according to the second embodiment.

FIG. 13 is a diagram illustrating an overall configuration of a data transfer system according to the second embodiment.

In the second embodiment, there is further provided a network management device 9 that manages the communication network.

In the second embodiment, the reception-side DTN 3 further includes a first monitoring unit 36. The first monitoring unit 36 has a function of monitoring a state of the communication network between the transmission-side DTN 1 and the reception-side DTN 3.

In the second embodiment, the determination unit 32 of the reception-side DTN 3 has a function of changing the priorities of the pieces of data depending on the state of the communication network between the transmission-side DTN 1 and the reception-side DTN 3.

Figure 14:
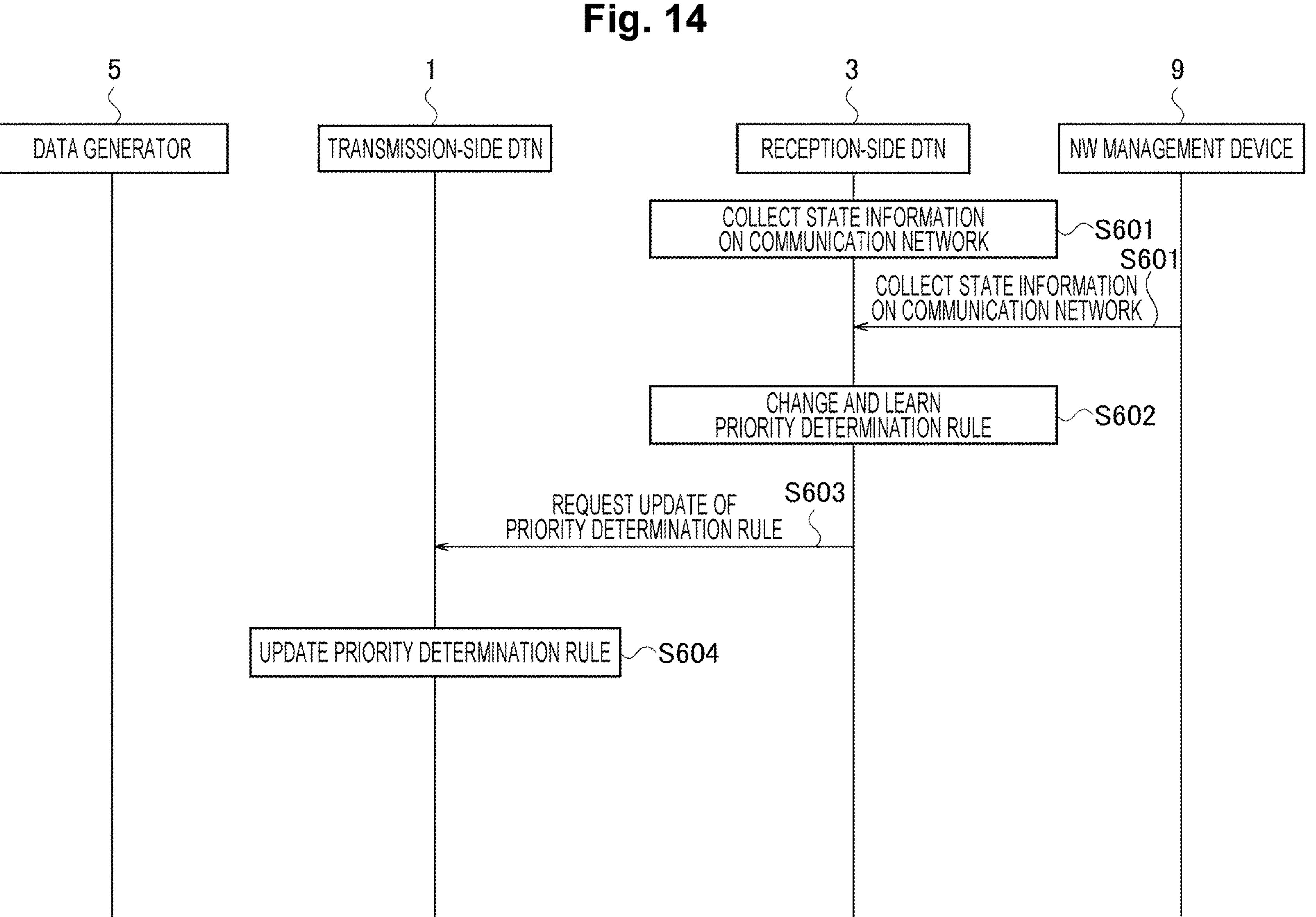
FIG. 14 is a sequence diagram illustrating a method of changing a data priority according to the second embodiment.

FIG. 14 is a sequence diagram illustrating a method of changing a data priority according to the second embodiment.

Step S601;

First, in the reception-side DTN 3, the first monitoring unit 36 collects state information on the communication network between the transmission-side DTN 1 and the reception-side DTN 3. At this time, the first monitoring unit 36 may collect the state information from the network management device 9.

Step S602;

Next, in a case where band limitation, congestion, failure, or the like occurs in the communication network between the transmission-side DTN 1 and the reception-side DTN 3, the determination unit 32 changes a priority of a file. For example, in a case where congestion occurs, there is a possibility that all files cannot be received, and thus, the determination unit 32 changes a priority of a file to give up transfer of a file having a low priority, or to transfer an essential file first.

Steps S603 to S604;

These steps are the same as steps S403 to S404.

According to the second embodiment, since the data priority is changed depending on the state of the communication network between the transmission-side DTN 1 and the reception-side DTN 3, it is possible to reliably transfer essential data even in a case where the band of the communication network is limited due to congestion or the like and all data cannot be transferred.

Third Embodiment

Figure 15:
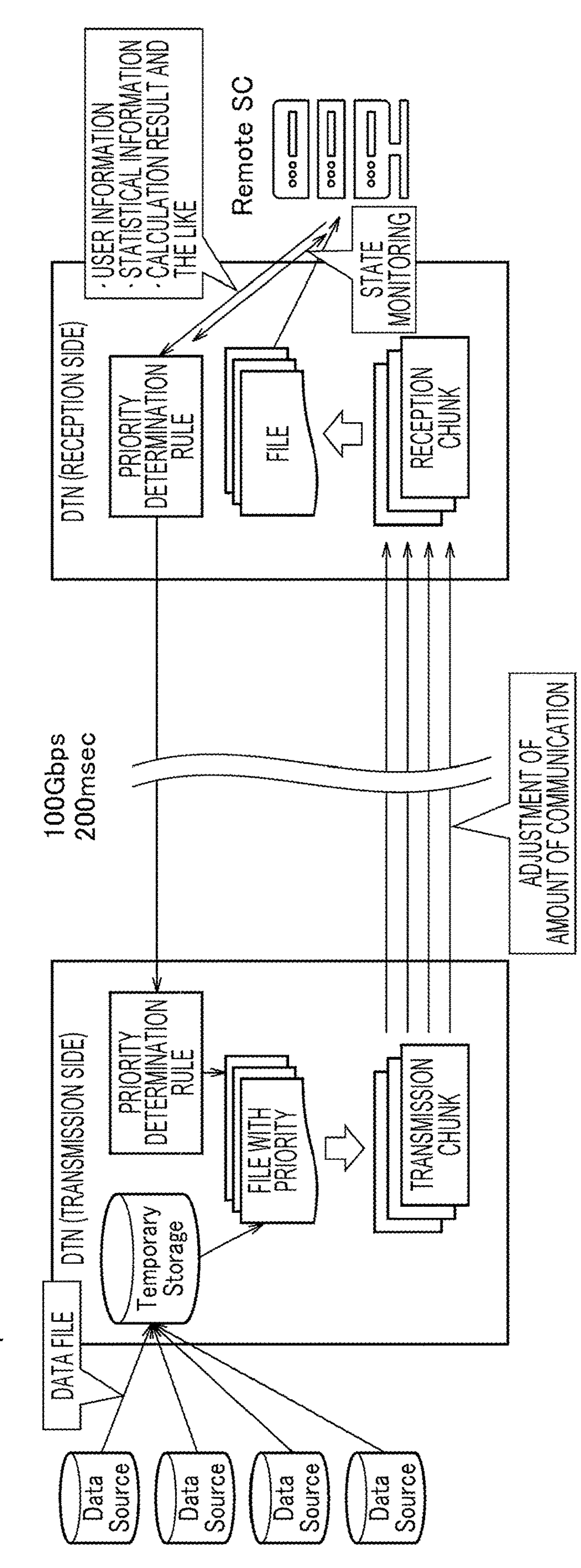
FIG. 15 is a diagram illustrating an outline of an invention according to a third embodiment.

FIG. 15 is a diagram illustrating an outline of an invention according to a third embodiment.

In the third embodiment, the transmission-side DTN adjusts the number of chunks to be transmitted to the reception-side DTN depending on a use situation of a calculation resource in the remote SC. As a result, analysis calculation of data can be executed in a desired time.

FIG. 16 is a diagram illustrating an overall configuration of a data transfer system according to the third embodiment.

In the third embodiment, the reception-side DTN 3 further includes a second monitoring unit 37. The second monitoring unit 37 has a function of monitoring a use situation of a calculation resource in the remote computer 7.

In the third embodiment, the transmission/reception unit 11 of the transmission-side DTN 1 has a function of adjusting the number of chunks to be transmitted to the reception-side DTN 3 depending on the use situation of the calculation resource in the remote computer 7.

Here, a data transfer method according to the third embodiment will be described.

In step S103 illustrated in FIG. 3, the transmission/reception unit 31 transmits use situation information on the calculation resource in the remote computer 7 to the transmission-side DTN 1.

In step S109 illustrated in FIG. 3, the transmission/reception unit 11 of the transmission-side DTN 1 reduces the number of chunks to be output to the communication network in a case where calculation cannot be performed by the remote computer 7 and in a case where the file cannot be received by the remote computer 7, even if a file is transferred at high speed on the basis of the use situation of the calculation resource (CPU usage rate, memory usage rate, or the like) in the remote computer 7. At this time, the transmission/reception unit 11 may suppress the band of the communication network, and perform release of a communication resource for an amount of communication, a power cost, or other processing, and the like.

Figure 17:
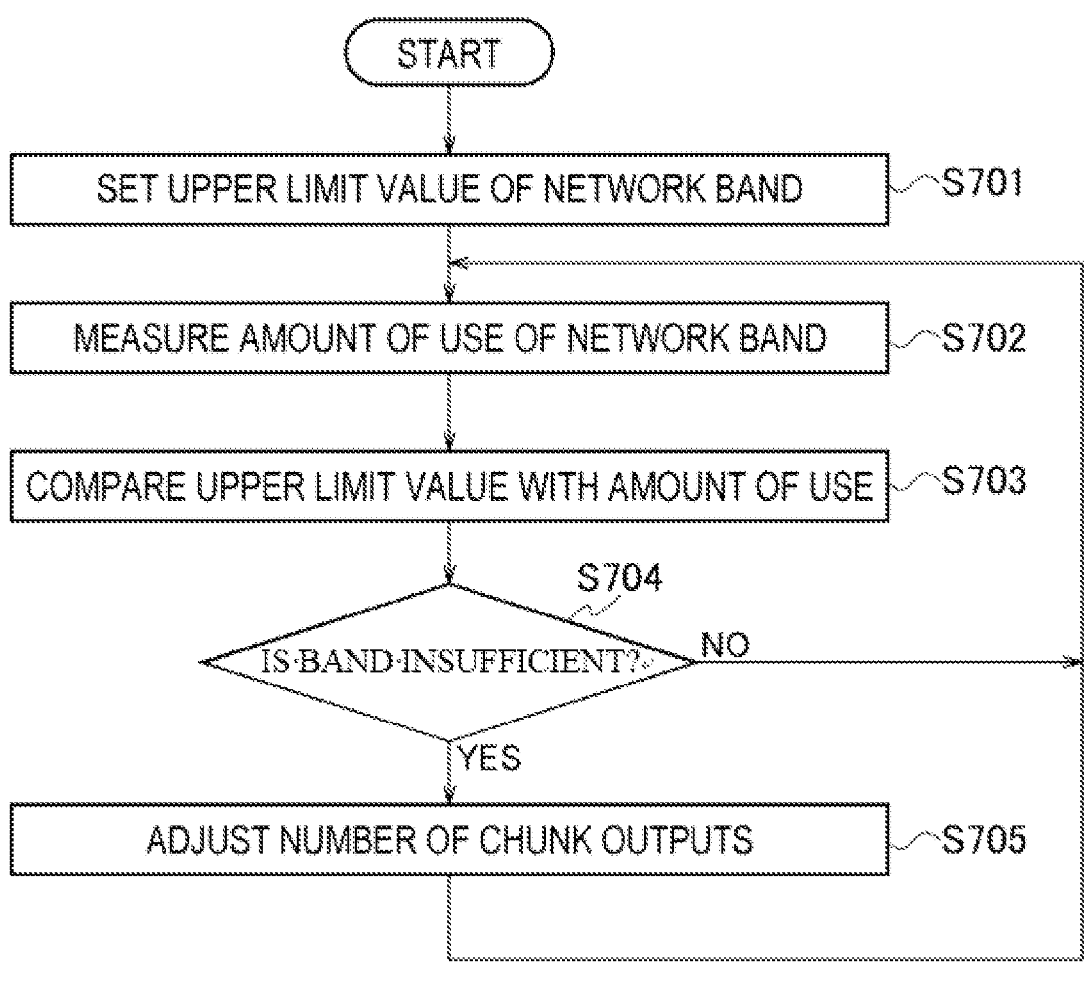
FIG. 17 is a flow diagram illustrating a method of adjusting the number of chunk outputs according to the third embodiment.

FIG. 17 is a flow diagram illustrating a method of adjusting the number of chunk outputs.

Step S701;

First, in the transmission-side DTN 1, the transmission/reception unit 11 sets an upper limit value of a band that can be used in the communication network between the transmission-side DTN 1 and the reception-side DTN 3.

Step S702;

Next, the transmission/reception unit 11 measures an amount of use of a band currently used in the communication network.

Step S703;

Next, the transmission/reception unit 11 compares the upper limit value of the band with the amount of use of the band.

Step S704;

In a case where the amount of use of the band is less than the upper limit value of the band, the transmission/reception unit 11 returns to step S702. In a case where the amount of use of the band is greater than or equal to the upper limit value of the band, the transmission/reception unit 11 proceeds to step S705.

Step S705;

The transmission/reception unit 11 reduces the number of chunks to be output to the communication network.

For example, the transmission/reception unit 11 fairly reduces the numbers of transmissions per unit time by changing the allocated numbers I, M, and N allocated to the high priority, the medium priority, and the low priority to "I±1", "M−1", and "N−1", respectively.

For example, the transmission/reception unit 11 reduces the numbers of transmissions per unit time depending on the priority by changing the allocated numbers I, M, and N to "I±0", "M−10", and "N−100", respectively.

According to the third embodiment, since the transmission-side DTN 1 adjusts the number of chunks to be transmitted to the reception-side DTN 3 depending on the use situation of the calculation resource in the remote computer 7, analysis calculation of data can be executed in a desired time.

Fourth Embodiment

In a fourth embodiment, the transmission-side DTN transmits highest priority data having a highest priority to the reception-side DTN as it is without performing the processing of performing consolidation into a chunk having a size greater than or equal to a certain size. As a result, there is no delay due to the processing of consolidating data into a chunk, and highest priority data can be transferred at a highest speed.

In the fourth embodiment, the generation unit 14 of the transmission-side DTN 1 has a function of directly transferring data having a size less than or equal to a certain size distributed to a distribution destination having the highest priority (highest priority data) to the transmission/reception unit 11 without performing the processing of performing consolidation into a chunk having a size greater than or equal to a certain size.

Here, a data transfer method according to the fourth embodiment will be described.

In step S108 illustrated in FIG. 3, the generation unit 14 does not perform the processing of performing consolidation into a chunk having a size greater than or equal to a certain size, as for a file (highest priority file) having a size less than or equal to a certain size distributed to a distribution destination having a "high priority" that is the highest priority among a "low priority", a "medium priority", and the "high priority", and passes the file as it is to the transmission/reception unit 11.

In step S109 illustrated in FIG. 3, the transmission/reception unit 11 transmits the highest priority file to the reception-side DTN 3 via the communication network at a timing when the file is passed from the generation unit 14.

Note that the highest priority refers to a priority that is the highest among priorities different from each other. In a case where the low priority, the medium priority, the high priority, and the highest priority are included, the highest priority is the highest priority. In a case where the low priority, the medium priority, and the high priority are included, the high priority is the highest priority. At this time, the high priority may not be treated as the highest priority.

According to the fourth embodiment, since the highest priority data is transmitted to the reception-side DTN as it is without performing the processing of performing consolidation into a chunk having a size greater than or equal to a certain size, there is no delay due to the processing of consolidating data into a chunk, and the data can be transferred at the highest speed.

Fifth Embodiment

In a fifth embodiment, an acceleration device is further provided. The acceleration device is disposed at each of packet input/output ends of the transmission-side DTN 1 and the reception-side DTN 3, and is a device that speeds up data by performing, for example, protocol conversion. In particular, when it is desired to implement high-speed data transfer at a long distance by using RDMA in a case where the communication network has a long distance, it is possible to implement high-speed chunk transfer by using the acceleration device.

In addition, the acceleration device can acquire an amount of transmission data and the like transmitted by the transmission-side DTN 1. For that reason, in the reception-side DTN 3, the first monitoring unit 36 may collect state information on the communication network or the like from the acceleration device, and the determination unit 32 may determine or change the priorities of the pieces of data on the basis of a state of the communication network collected from the acceleration device.

Note that the acceleration device can acquire the amount of transmission data by using a known technique such as a simple network management protocol (SNMP). In addition to the amount of transmission data, the acceleration device can acquire the remaining numbers of buffers and queues for reception chunk data of the reception-side DTN 3. The acceleration device is a known technique.

The acceleration device may be incorporated in each DTN as an NIC or the like, may be incorporated in the DTN by software or the like, or may be installed as a node different from the DTN. The acceleration device may also perform requirement setting for an optical path to be connected, or the like on the basis of the data priority.

According to the fifth embodiment, since the acceleration device is installed, the chunk can be transferred at high speed.

Sixth Embodiment

The first to fifth embodiments may be combined. For example, the transmission-side DTN 1 may adjust the number of chunks to be transmitted to the reception-side DTN 3 depending on a state of the communication network. The reception-side DTN 3 may dynamically change the data priority depending on the use situation of the calculation resource in the remote computer 7.

Others

The present invention is not limited to the above embodiments. The present invention may be modified in various manners within the gist of the present invention.

Figure 18:
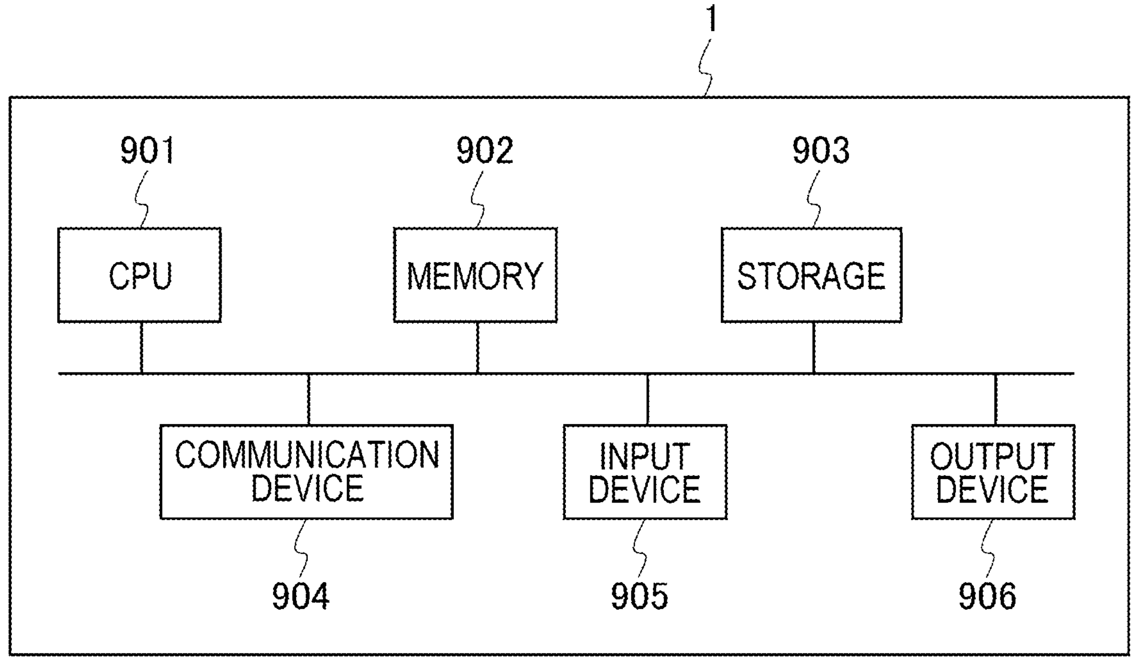
FIG. 18 is a diagram illustrating a hardware configuration of a transmission-side DTN.

The transmission-side DTN 1 of the above present embodiments can be implemented by using a generalpurpose computer system including a CPU 901, a memory 902, a storage 903, a communication device 904, an input device 905, and an output device 906, for example, as illustrated in FIG. 18. The memory 902 and the storage 903 are storage devices. In the computer system, each function of the transmission-side DTN 1 is implemented by causing the CPU 901 to execute a predetermined program loaded on the memory 902.

The transmission-side DTN 1 may be implemented by one computer. The transmission-side DTN 1 may be implemented by a plurality of computers. The transmission-side DTN 1 may be a virtual machine that is implemented in a computer. The program for the transmission-side DTN 1 can be stored in a computer-readable recording medium such as an HDD, an SSD, a USB memory, a CD, or a DVD. The program for the transmission-side DTN 1 can also be distributed via the communication network.

The reception-side DTN 3 has a hardware configuration similar to that of the transmission-side DTN 1.

REFERENCE SIGNS LIST

1 Transmission-side DTN
11 Transmission/reception unit
12 Determination unit
13 Distribution unit
14 Generation unit
15 Storage unit
16 Request unit
3 Reception-side DTN
31 Transmission/reception unit
32 Determination unit
33 Collection unit
34 Restoration unit
35 Storage unit
36 First monitoring unit
37 Second monitoring unit
5 Data generator
51 Generation unit
52 Storage unit
7 Remote computer
71 Request unit
72 Calculation unit
73 Storage unit
9 Network management device
901 CPU
902 Memory
903 Storage
904 Communication device
905 Input device
906 Output device

The invention claimed is:

1. A data transfer system comprising:

a transmission-side data transfer device that bundles and transmits a plurality of pieces of data generated by a data generator; and a reception-side data transfer device that receives and transmits a bundle of the pieces of data to a remote computer, wherein the transmission-side data transfer device includes:

a distribution unit, including one or more processors, configured to respectively distribute the plurality of pieces of data generated by the data generator to distribution destinations having priorities corresponding to priorities of the respective pieces of data in accordance with the priorities of the pieces of data;

a generation unit, including one or more processors, configured to consolidate a plurality of pieces of data respectively distributed to the distribution destinations into each chunk having a size greater than or equal to a certain size, in order from one of the distribution destinations having a high priority, wherein the generation unit is configured to withhold performing consolidation of highest priority data having a highest priority and a size less than or equal to a certain size into a chunk having a size greater than or equal to the certain size; and a transmission unit, including one or more processors, configured to store each of the chunks in a ring structured memory, and transmit each of the chunks from the ring structured memory using a Remote Direct Memory Access protocol to the reception-side data transfer device at a timing when the plurality of pieces of data is consolidated into each of the chunks, and the reception-side data transfer device includes a determination unit, including one or more processors, configured to:

determine the priorities of the pieces of data depending on usage situations of the pieces of data in the remote computer.

2. The data transfer system according to claim 1, wherein the transmission unit is configured to transmit data having a high priority to the reception-side data transfer device before receiving a request for data from the reception-side data transfer device.

3. The data transfer system according to claim 1, wherein the determination unit is configured to change the priorities of the pieces of data depending on a change in a calculation content in the remote computer.

4. The data transfer system according to claim 1, wherein the determination unit configured to change the priorities of the pieces of data depending on a state of a communication network between the transmission-side data transfer device and the reception-side data transfer device.

5. The data transfer system according to claim 1, wherein the transmission unit is configured to adjust a number of chunks to be transmitted to the reception-side data transfer device depending on a use situation of a calculation resource in the remote computer.

6. A data transfer device comprising:

a distribution unit, including one or more processors, configured to respectively distribute a plurality of pieces of data generated by a data generator to distribution destinations having priorities corresponding to priorities of the respective pieces of data in accordance with the priorities of the pieces of data determined depending on usage situations of the pieces of data in a remote computer;

a generation unit, including one or more processors, configured to consolidate a plurality of pieces of data respectively distributed to the distribution destinations into each chunk having a size greater than or equal to a certain size, in order from one of the distribution destinations having a high priority, wherein the generation unit is configured to withhold performing consolidation of highest priority data having a highest priority and a size less than or equal to a certain size into a chunk having a size greater than or equal to the certain size; and a transmission unit, including one or more processors, configured to store each of the chunks in a ring structured memory, and transmit each of the chunks from the ring structured memory using a Remote Direct Memory Access protocol to a data transfer device at a timing when the plurality of pieces of data is consolidated into each of the chunks.

7. A data transfer method performed by a data transfer device, the data transfer method comprising:

respectively distributing a plurality of pieces of data generated by a data generator to distribution destinations having priorities corresponding to priorities of the respective pieces of data in accordance with the priorities of the pieces of data determined depending on usage situations of the pieces of data in a remote computer;

consolidating a plurality of pieces of data respectively distributed to the distribution destinations into each chunk having a size greater than or equal to a certain size, in order from one of the distribution destinations having a high priority, wherein consolidating comprises withholding performing consolidation of highest priority data having a highest priority and a size less than or equal to a certain size into a chunk having a size greater than or equal to the certain size;

storing each of the chunks in a ring structured memory; and transmitting each of the chunks from the ring structured memory using a Remote Direct Memory Access protocol to a data transfer device at a timing when the plurality of pieces of data is consolidated into each of the chunks.

* * * * *